(12) United States Patent
Shioya

(10) Patent No.: US 9,973,720 B2
(45) Date of Patent: May 15, 2018

(54) SOLID STATE IMAGING DEVICE, METHOD OF OUTPUTTING IMAGING SIGNAL AND ELECTRONIC DEVICE

(71) Applicant: Sony Corporation, Tokyo (JP)

(72) Inventor: Hiroyuki Shioya, Kanagawa (JP)

(73) Assignee: Sony Corporation, Tokyo (JP)

( * ) Notice: Subject to any disclaimer, the term of this patent is extended or adjusted under 35 U.S.C. 154(b) by 191 days.

(21) Appl. No.: 14/951,215

(22) Filed: Nov. 24, 2015

(65) Prior Publication Data

US 2016/0080677 A1    Mar. 17, 2016

Related U.S. Application Data

(63) Continuation of application No. 13/780,141, filed on Feb. 28, 2013, now Pat. No. 9,225,917.

(30) Foreign Application Priority Data

Mar. 28, 2012 (JP) ................................ 2012-072656

(51) Int. Cl.

| | |
|---|---|
| *H04N 5/378* | (2011.01) |
| *H04N 5/335* | (2011.01) |
| *H04N 5/235* | (2006.01) |
| *H04N 5/355* | (2011.01) |
| *H04N 5/374* | (2011.01) |
| *H04N 5/232* | (2006.01) |
| *H04N 5/357* | (2011.01) |

(52) U.S. Cl.
CPC .......... *H04N 5/378* (2013.01); *H04N 5/2355* (2013.01); *H04N 5/23296* (2013.01); *H04N 5/3355* (2013.01); *H04N 5/355* (2013.01); *H04N 5/357* (2013.01); *H04N 5/3742* (2013.01)

(58) Field of Classification Search
CPC .... H04N 5/378; H04N 5/357; H04N 5/23296; H04N 5/3742; H04N 5/355; H04N 5/2355; H04N 5/3355
See application file for complete search history.

(56) References Cited

U.S. PATENT DOCUMENTS

| | | |
|---|---|---|
| 8,659,688 B2 | 2/2014 | Wakano et al. |
| 8,885,083 B2 | 11/2014 | Wakano et al. |
| 9,049,393 B2 | 6/2015 | Wakano et al. |
| 9,094,623 B2 | 7/2015 | Kawaguchi |

(Continued)

FOREIGN PATENT DOCUMENTS

JP    2008-124842 A    5/2008

*Primary Examiner* — Tony Ko
(74) *Attorney, Agent, or Firm* — Wolf, Greenfield & Sacks, P.C.

(57) ABSTRACT

There is provided a solid state imaging device including a first analog-to-digital converting unit that compares a level of an analog reference signal with a first inclination with a level of an analog pixel signal output from a pixel array unit, and converts the analog pixel signal into a first digital pixel signal, a second analog-to-digital converting unit that compares a level of an analog reference signal with a second inclination that is different in inclination from the analog reference signal with the first inclination with a level of the analog pixel signal, and converts the analog pixel signal into a second digital pixel signal, and a digital compositing unit that composites the first digital pixel signal with the second digital pixel signal, and outputs a composite result.

17 Claims, 25 Drawing Sheets

(56) References Cited

U.S. PATENT DOCUMENTS

| | | |
|---|---|---|
| 9,225,917 B2 | 12/2015 | Shioya |
| 9,344,662 B2 | 5/2016 | Wakano et al. |
| 9,590,007 B2 | 3/2017 | Wakano et al. |
| 9,609,240 B2 | 3/2017 | Kawaguchi |
| 9,692,994 B2 | 6/2017 | Kawaguchi |
| 9,716,122 B2 | 7/2017 | Wakano et al. |
| 2011/0037868 A1* | 2/2011 | Ota .................. H04N 5/357 348/222.1 |
| 2011/0128400 A1 | 6/2011 | Wakano et al. |
| 2012/0194722 A1 | 8/2012 | Wang et al. |
| 2013/0075588 A1 | 3/2013 | Kawaguchi |
| 2013/0256512 A1 | 10/2013 | Shioya |
| 2014/0118593 A1 | 5/2014 | Wakano et al. |
| 2015/0009384 A1 | 1/2015 | Wakano et al. |
| 2015/0163420 A1 | 6/2015 | Kawaguchi |
| 2015/0326807 A1 | 11/2015 | Wakano et al. |
| 2016/0065875 A1 | 3/2016 | Wakano et al. |
| 2016/0204159 A1 | 7/2016 | Wakano et al. |
| 2017/0040363 A1 | 2/2017 | Wakano et al. |
| 2017/0041559 A1 | 2/2017 | Kawaguchi |
| 2017/0118420 A1 | 4/2017 | Kawaguchi |
| 2017/0223297 A1 | 8/2017 | Kawaguchi |

\* cited by examiner

FIG.24

| G | B | G | B |
|---|---|---|---|
| R | G | R | G |
| G | B | G | B |
| R | G | R | G |

SOLID STATE IMAGING DEVICE, METHOD OF OUTPUTTING IMAGING SIGNAL AND ELECTRONIC DEVICE

RELATED APPLICATIONS

This application is a continuation of and claims the benefit under 35 U.S.C. § 120 of U.S. application Ser. No. 13/780,141 entitled "SOLID STATE IMAGING DEVICE, METHOD OF OUTPUTTING IMAGING SIGNAL AND ELECTRONIC DEVICE" filed Feb. 28, 2013, which claims priority under 35 U.S.C. § 119 to Japanese Patent Application No. JP 2012-072656 filed Mar. 28, 2012, each of which is hereby incorporated by reference in its entirety.

BACKGROUND

The present technology relates to a solid state imaging device, a method of outputting an imaging signal, and an electronic device, and more particularly, to a CMOS image sensor.

In the past, techniques of enlarging a dynamic range by finely quantizing a dark portion of a pixel signal of a solid state imaging device with a high gain and roughly quantizing a bright portion with a low gain have been known. For example, JP 2008-124842 A discloses a technique of generating an analog reference signal with a small inclination and an analog reference signal with a large inclination by time division, comparing a level of each analog reference signal with a level of an analog pixel signal, and obtaining a digital pixel signal.

SUMMARY

In the technique discussed in JP 2008-124842 A, two line memories for temporarily storing the digital pixel signals generated using the two analog reference signals are necessary, and thus the circuit size increases. Further, since the time division is employed, the above-mentioned technique is not optimal for increasing the speed of AD conversion (analog-to-digital conversion).

The present technology is directed to reducing the circuit size and achieving a high-speed operation and low power consumption.

According to an embodiment of the present disclosure, there is provided a solid state imaging device including a first analog-to-digital converting unit that compares a level of an analog reference signal with a first inclination with a level of an analog pixel signal output from a pixel array unit, and converts the analog pixel signal into a first digital pixel signal, a second analog-to-digital converting unit that compares a level of an analog reference signal with a second inclination that is different in inclination from the analog reference signal with the first inclination with a level of the analog pixel signal, and converts the analog pixel signal into a second digital pixel signal, and a digital compositing unit that composites the first digital pixel signal with the second digital pixel signal, and outputs a composite result.

In the present technology, the first analog-to-digital converting unit compares a level of an analog reference signal with a first inclination with a level of an analog pixel signal output from a pixel array unit, and converts the analog pixel signal into a first digital pixel signal. Further, the second analog-to-digital converting unit compares a level of an analog reference signal with a second inclination with a level of the analog pixel signal, and converts the analog pixel signal into a second digital pixel signal. Here, the analog reference signal with the second inclination is different in inclination from the analog reference signal with the first inclination. Further, the digital compositing unit composites the first digital pixel signal with the second digital pixel signal, and outputs a composite result.

As described above, in the present technology, the first digital pixel signal and the second digital pixel signal are simultaneously obtained by the first analog-to-digital converting unit and the second analog-to-digital converting unit. Thus, since a line memory that temporarily stores the first digital pixel signal and the second digital pixel signal is not necessary, the circuit size can be reduced, and the product cost can be reduced. Further, the first digital pixel signal and the second digital pixel signal are not obtained by time division, an AD conversion time can be reduced, and a high-speed operation and low power consumption can be achieved.

Further, the digital compositing unit may include a determining unit that, of the first digital pixel signal and the second digital pixel signal, regards a digital pixel signal converted using an analog reference signal with a small inclination as one digital pixel signal, regards a digital pixel signal converted using an analog reference signal with a large inclination as the other digital pixel signal, compares the one digital pixel signal with a predetermined threshold value to determine a magnitude relation, and obtains a selection signal, a selecting unit that extracts the one digital pixel signal when it is determined that the one digital pixel signal is less than the predetermined threshold value based on the selection signal, and extracts the other digital pixel signal when it is determined that the one digital pixel signal is equal to or more than the predetermined threshold value, and a combining unit that combines the extracted digital pixel signal with the selection signal, and outputs a combined signal. In this case, it is possible to suppress output bandwidth and to decrease processing load in an external circuit, comparing to the case where both of the first digital pixel signal and the second digital pixel signal are to be output. The solid state imaging device may further include a signal processing unit that receives an output signal of the digital compositing unit, and performs magnification correction on the digital pixel signal based on the selection signal combined with the digital pixel signal.

Further, the digital compositing unit may combine the first digital pixel signal and the second digital pixel signal to be composited into a signal with a large bit width and outputs a composite result, or interleaves and composites the first digital pixel signal and the second digital pixel signal, and output a composite result. In this case, the solid state imaging device may further include a signal processing unit that processes an output signal of the digital compositing unit. The signal processing unit may include a determining unit that, of the first digital pixel signal and the second digital pixel signal, regards a digital pixel signal converted using an analog reference signal with a small inclination as one digital pixel signal, regards a digital pixel signal converted using an analog reference signal with a large inclination as the other digital pixel signal, compares the one digital pixel signal with a predetermined threshold value to determine a magnitude relation, and obtains a selection signal, a selecting unit that extracts the one digital pixel signal when it is determined that the one digital pixel signal is less than the predetermined threshold value based on the selection signal, and extracts the other digital pixel signal when it is determined that the one digital pixel signal is equal to or more than the predetermined threshold value, and a signal processing unit that performs magnification correction on the extracted digital pixel signal based on the selection signal.

Further, the digital compositing unit may further include an estimating unit that calculates correction information used to accurately perform magnification correction.

Further, the first inclination and the second inclination may each be an inclination obtained based on a noise characteristic of the pixel signal. Such inclination enables the reference signal generator to be configured with a simple integrator and simply implemented.

Further, the analog-to-digital converting unit may transition to a next operation when pulses applied to a counter that counts a conversion time in the analog-to-digital converting unit reach a predetermined number. Thus, the operation can be performed at a high speed, and the power consumption can be reduced.

The first and the second inclination, and a predetermined number in the analog-to-digital converting are given, for example, where a standard deviation of noise when a light quantity is 0 is represented by σ (electron), a number of saturated electrons of a pixel is represented by Vwhite, and parameters are represented by Ka and Kb, by Vthresh causing Tover of the following Formula (1) to be minimum, the first inclination is given as ΔSa, the second inclination is given as ΔSb, and the predetermined number in the analog-to-digital converting unit is given as Tover.

$$Tover := \max(V_{thresh}/\Delta Sa, V_{white}/\Delta Sb) \quad (1)$$

$$\begin{pmatrix} \Delta Sa = Ka * \sigma \\ \Delta Sb = Kb * \sqrt{\sigma^2 + Vthresh} \end{pmatrix}$$

Further, the analog reference signal with the first inclination and the analog reference signal with the second inclination may be in a mutually scaled relation. In this case, for example, one of the analog reference signal with the first inclination and the analog reference signal with the second inclination may be generated by a reference signal generator, and the other may be obtained in a manner that an analog reference signal generated by the reference signal generator is amplified by an amplifier or attenuated by an attenuator. Thus, the product cost can be reduced.

Further, in the present technology, for example, the pixel array unit is a pixel array unit in which pixels having greatly different sensitivity of light are present together. For example, the pixel array unit may include both a pixel having sensitivity to visible light and a pixel having sensitivity to invisible light. Further, for example, the pixel array unit may include both a pixel having sensitivity in a narrow band and a pixel having sensitivity in a broad band. In this pixel array unit, a digital pixel signal having little noise and a large dynamic range can be obtained.

Further, in the present technology, the solid state imaging device may further include a multiplexer that selectively supplies the analog-to-digital converting unit with pixel signals of a plurality of columns of the pixel array unit. In this case, the number of analog-to-digital converting units can be reduced, and even when a mounting area of a semiconductor substrate is narrow, mounting can be easily performed.

Further, in the present technology, the first analog-to-digital converting unit and the second analog-to-digital converting unit may be arranged to be opposite to each other with the pixel array unit interposed therebetween. Thus, the first analog-to-digital converting unit and the second analog-to-digital converting unit that operate in parallel can be efficiently arranged on the semiconductor substrate.

According to the embodiments of the present technology, it is possible to reduce the circuit size and achieve a high-speed operation and low power consumption.

BRIEF DESCRIPTION OF THE DRAWINGS

FIG. 24 is a diagram of a color array example of a pixel array unit;

DETAILED DESCRIPTION OF THE EMBODIMENT(S)

Figure 1:
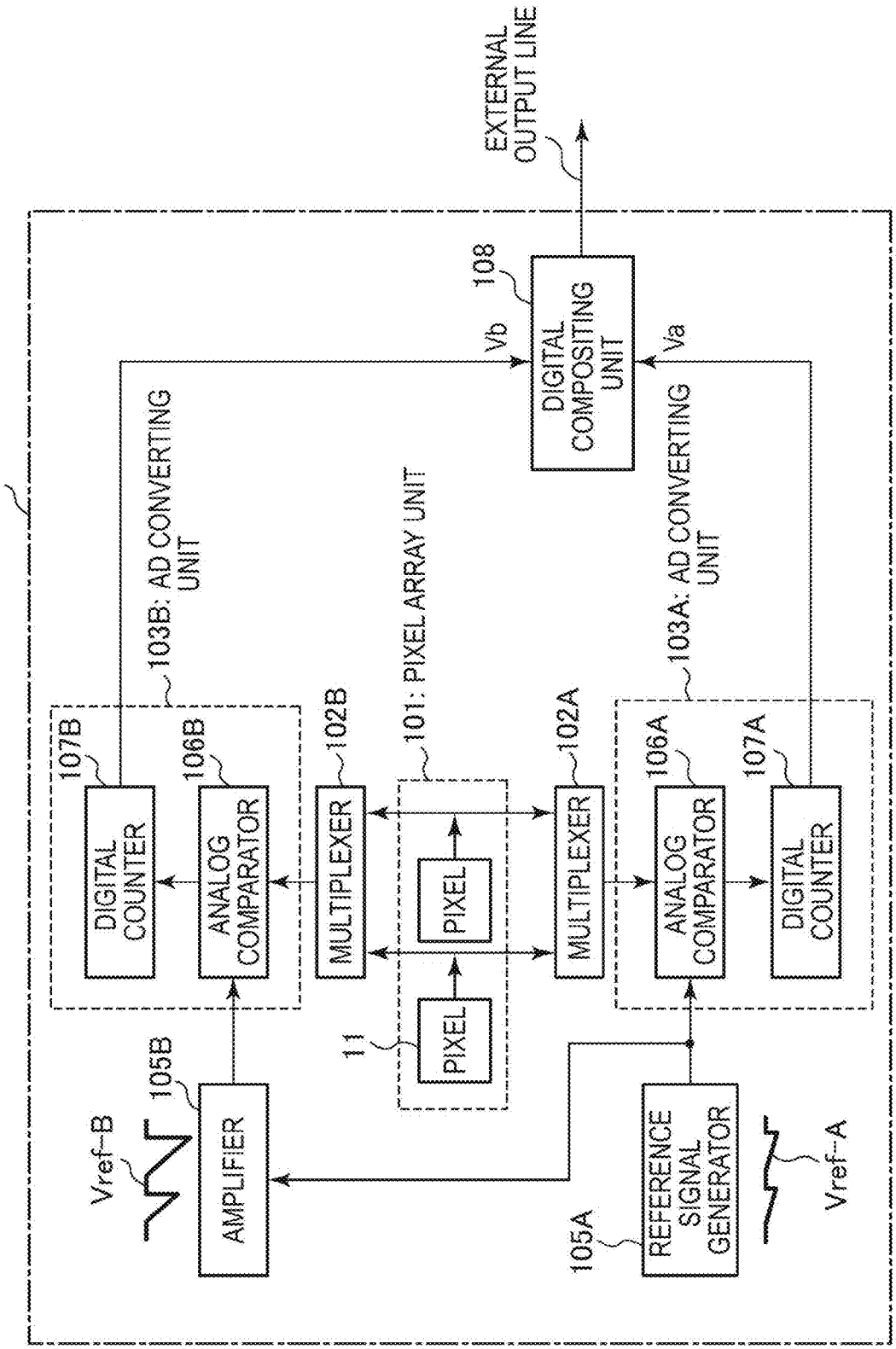
FIG. 1 is a block diagram illustrating a configuration example of a CMOS image sensor according to an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, a mode for embodying the disclosure (hereinafter referred to as an "embodiment") will be described. The description will proceed in the following order.

1. Embodiment
2. Modified Example

1. Embodiment

[Configuration Example of CMOS Image Sensor]

FIG. 1 illustrates a configuration example of a CMOS image sensor 100 according to an embodiment. The CMOS image sensor 100 is used in various kinds of electronic devices such as video cameras, digital still cameras, cameras mounted in a mobile phone, monitoring cameras, cameras for a personal computer (PC), or the like. Here, the CMOS image sensor refers to an image sensor manufactured by applying or partially using a CMOS process.

The CMOS image sensor 100 includes a pixel array unit 101, multiplexers 102A and 102B, AD (analog-to-digital) converting units 103A and 103B, a reference signal generator 105A, an amplifier 105B, and a digital compositing unit 108. The AD converting units 103A and 103B simultaneously convert the same analog pixel signal output from a unit pixel 11 of the pixel array unit 101 into a digital pixel signal in parallel.

The multiplexers 102A and 102B selectively supply pixel signals of a plurality of columns of the pixel array unit 101 (pixel signals of two columns in this example) to the AD converting units 103A and 103B. Since the number of the AD converting units 103A and 103B can be reduced using the multiplexers 102A and 102B as described above, mounting can be easily performed even when a mounting area of a semiconductor substrate is narrow. The AD converting units 103A and 103B are arranged to be opposite to each other with the pixel array unit 101 interposed therebetween. Thus, the AD converting units 103A and 103B that operate in parallel can be efficiently arranged on the semiconductor substrate. In other words, even when a column width is narrow, many AD converting units can be arranged by the opposed arrangement, and thus the mounting area can be reduced. Meanwhile, when a mounting cost need not be considered or when a sufficient mounting area is secured, a one-sided arrangement may be employed. In this case, the digital compositing unit 108 is arranged for each column, and thus the data transfer rate can be further increased.

The AD converting unit 103A finely quantizes an analog pixel signal with a high gain to obtain a digital pixel signal. In other words, the AD converting unit 103A compares a level of an analog reference signal (a ramp signal) with a small inclination generated by the reference signal generator 105A with a level of an analog pixel signal, and converts the analog pixel signal into the digital pixel signal. The AD converting unit 103A includes an analog comparator 106A and a digital counter 107A. The analog comparator 106A compares a level of an analog reference signal Vref-A with a small inclination generated by the reference signal generator 105A with a level of an analog pixel signal output from the pixel array unit 101.

The digital counter 107A measures a conversion time by counting clock pulses, and measures a level value based on the length of the conversion time. The digital counter 107A stops its counting operation at a point in time at which the analog reference signal Vref-A serving as the ramp signal intersects with the analog pixel signal based on the comparison output of the analog comparator 106A. The level value measured by the digital counter 107A serves as an output of the AD converting unit 103A, that is, the converted digital pixel signal.

Further, the AD converting unit 103B roughly quantizes an analog pixel signal with a low gain to obtain a digital pixel signal. In other words, the AD converting unit 103B compares a level of an analog reference signal (ramp signal) with a large inclination generated by the amplifier 105B with a level of an analog pixel signal, and converts the analog pixel signal into the digital pixel signal.

Figure 2:
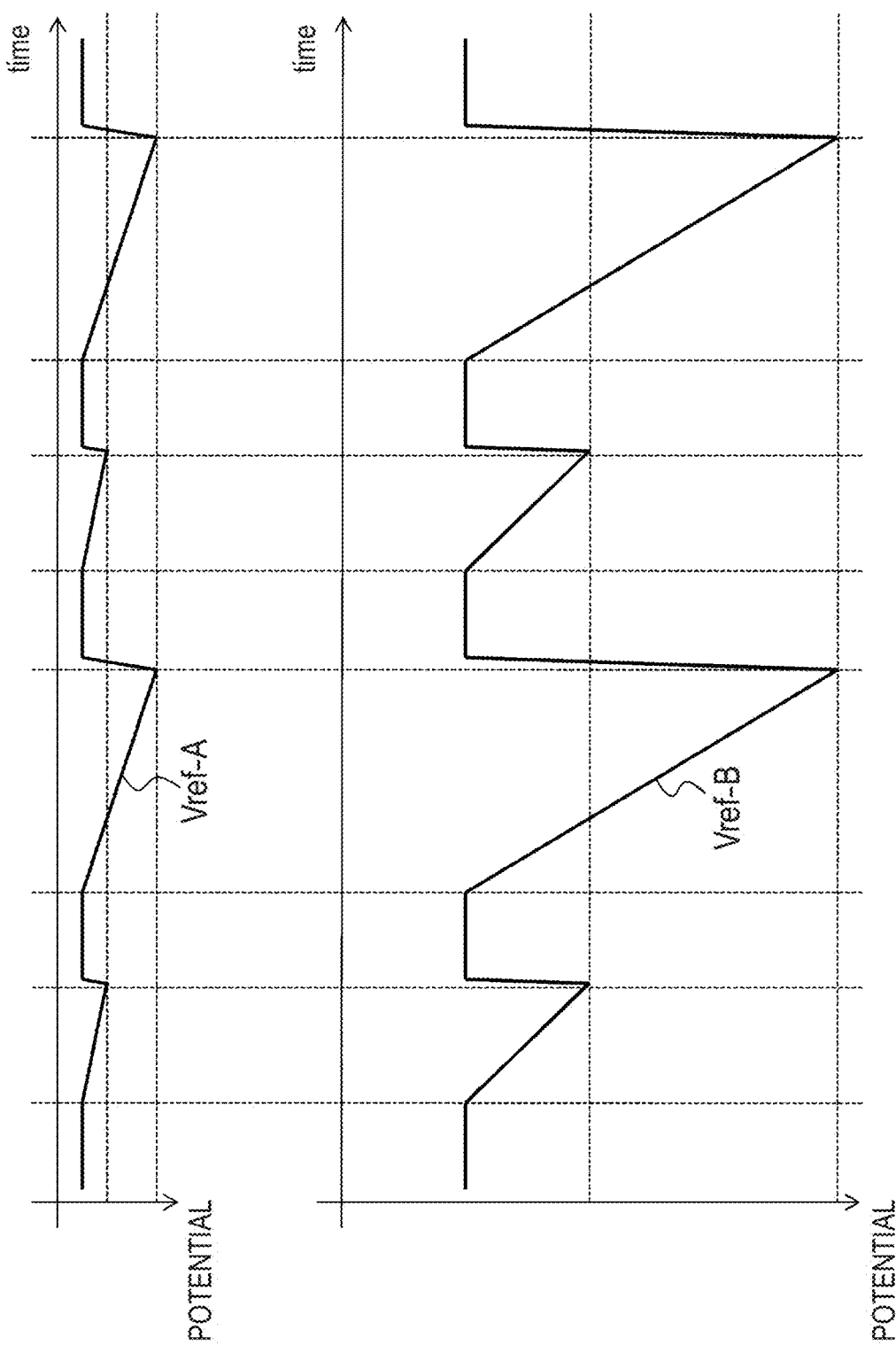
FIG. 2 is a diagram illustrating an example of a potential change of an analog reference signal Vref-A and an analog reference signal Vref-B which are in a mutually scaled relation.

The amplifier 105B amplifies the analog reference signal Vref-A generated by the reference signal generator 105A of the AD converting unit 103A, and obtains an analog reference signal Vref-B with a large inclination. In this case, the analog reference signal Vref-A and the analog reference signal Vref-B are in a mutually scaled relation. FIG. 2 illustrates an example of a potential change of the analog reference signal Vref-A and the analog reference signal Vref-B which are in the mutually scaled relation.

In other words, when the analog reference signal Vref-A and the analog reference signal Vref-B are in the mutually scaled relation, the analog reference signal Vref-B can be obtained by the amplifier 105B as described above. Based on a similar consideration, the analog reference signal Vref-A may be obtained by generating the analog reference signal Vref-B through a reference signal generator similar to the reference signal generator 105A and then attenuating the analog reference signal Vref-B through an attenuator. Of course, both of the analog reference signals Vref-A and Vref-B can be generated by a reference signal generator similar to the reference signal generator 105A.

The AD converting unit 103B includes an analog comparator 106B and a digital counter 107B. The analog comparator 106B compares a level of the analog reference signal Vref-B with a level of an analog pixel signal output from the pixel array unit. The digital counter 107B measures a conversion time by counting clock pulses, and measures a level value based on the length of the conversion time. The digital counter 107B stops its counting operation at a point in time at which the analog reference signal Vref-B serving as the ramp signal intersects with the analog pixel signal based on the comparison output of the analog comparator 106B. The level value measured by the digital counter 107B serves as an output of the AD converting unit 103B, that is, the converted digital pixel signal.

In this embodiment, the inclinations of the analog reference signal Vref-A and the analog reference signal Vref-B may be fixed. As the inclinations are fixed, it is not necessary to adjust ISO sensitivity before imaging, prediction control of an imaging parameter according to a scene to be imaged is simplified, and thus it is easy to handle a camera. Further, it is not necessary to implement a circuit for implementing programmability for adjusting ISO sensitivity, and hardware is simplified. Further, in this embodiment, when the number of pulses applied to the digital counters 107A and 107B in the AD converting units 103A and 103B reaches a predetermined number, the AD converting units 103A and 103B transition to the next operation. As a result, the operation speed increases, and the power consumption is reduced.

Figure 3:
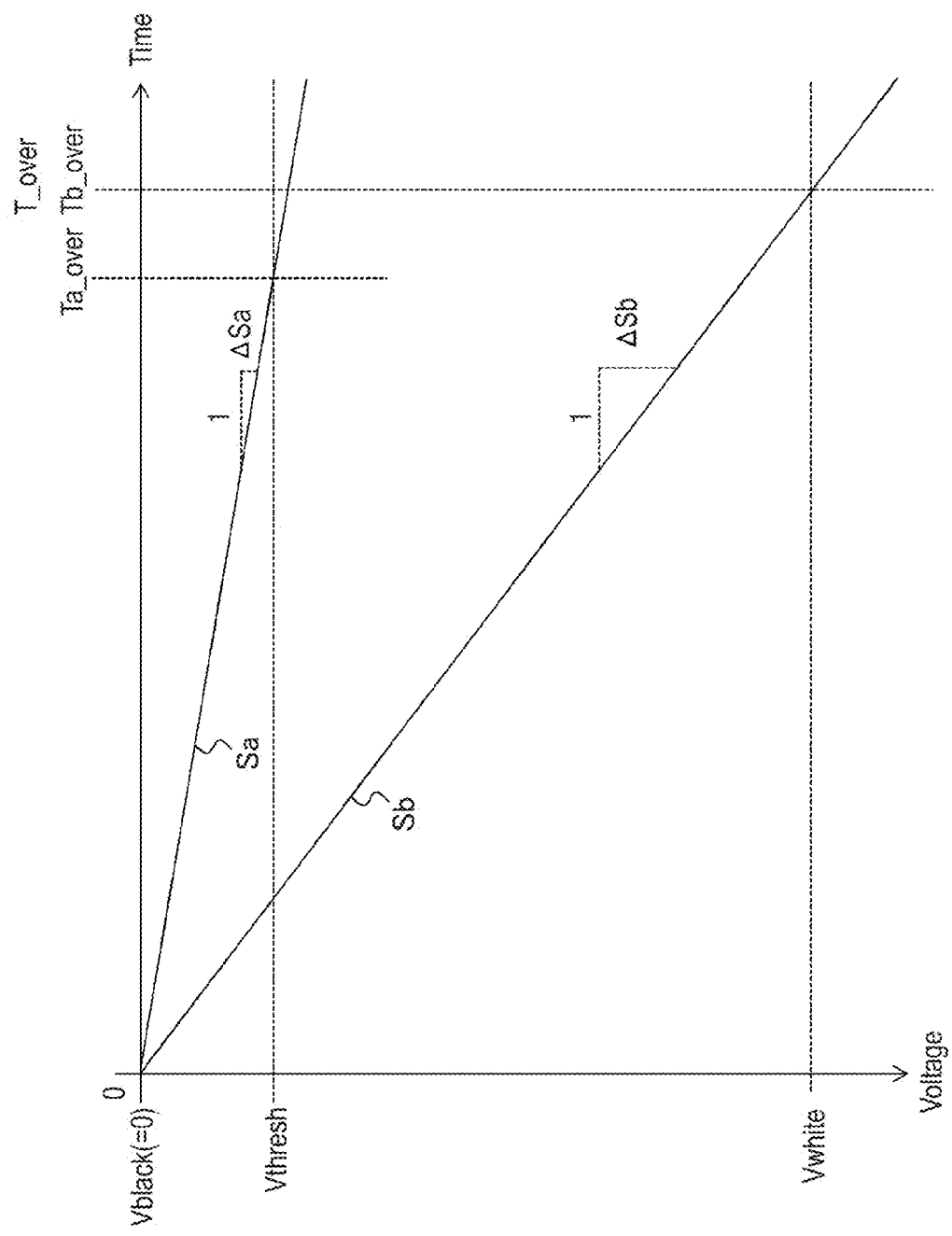
FIG. 3 is a diagram illustrating waveform examples of a plurality of analog reference signals having different inclinations.

FIG. 3 illustrates waveforms of the analog reference signal Vref-A and the analog reference signal Vref-B. Sa and Sb represent the analog reference signals Vref-A and Vref-B, respectively, and a count value of a horizontal axis corresponds to an analog value of a vertical axis in a one-to-one manner. Referring to FIG. 3, a vertical axis (voltage) represents an analog output voltage of a pixel, and particularly, an average voltage in a light-shielding state (that is, a state in which a received light quantity is 0) is represented by Vblack (=0), and a voltage of a white level representing a maximum received light quantity is represented by Vwhite. Meanwhile, the horizontal axis (time) represents a value obtained by counting a time through a digital counter.

An inclination ΔSa of the analog reference signal Vref-A, an inclination ΔSb of the analog reference signal Vref-B, and a time (a count number) Tover taken for AD conversion, and the like which are illustrated in FIG. 3 are obtained based on a noise characteristic of an analog pixel signal as follows.

First, as constants representing characteristics of a pixel signal to be input to the AD converting unit, a standard deviation of noise of the pixel signal in the light-shielding state (that is, the received light quantity 0) is σ in the following Formula (4), and a voltage of a white level representing a maximum received light quantity is Vwhite in the following Formula (3). The constants are estimate values obtained by an arbitrary method.

Further, as constants related to the image quality, a parameter for deciding the image quality of a dark image portion is Ka in the following Formula (4), and a parameter for deciding the image quality of a bright image portion is Kb in the following Formula (4). For example, normal values of the parameters Ka and Kb are 1 and 1, respectively. When the values decrease, the image quality is somewhat improved, but a time taken for AD conversion increases. For the sake of simplification of description, a pixel is assumed to convert n electrons into a voltage of n volts by photoelectric conversion.

Figure 4:
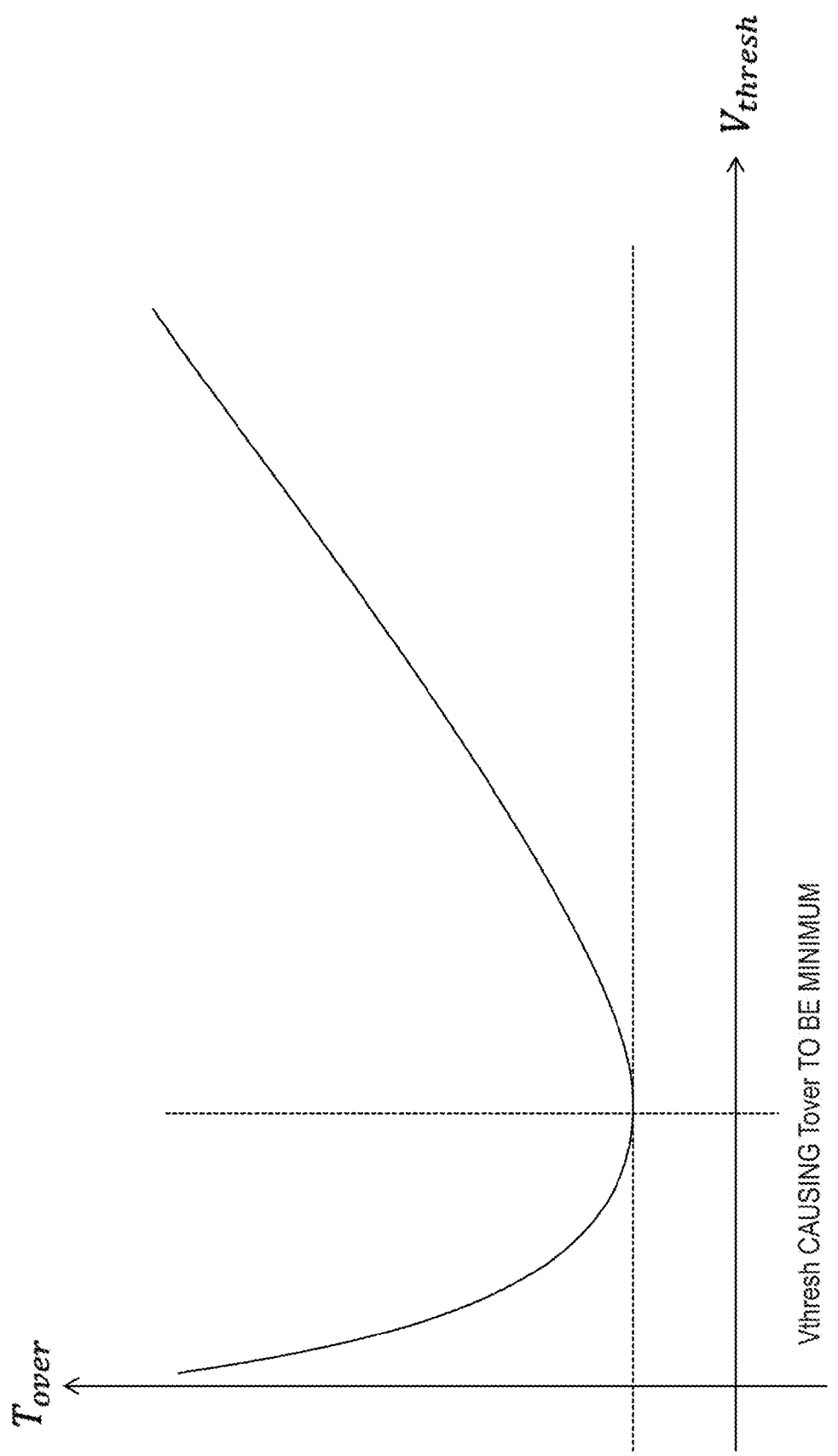
FIG. 4 is a diagram illustrating a relation between Vthresh and Tover when inclinations ΔSa and ΔSb of an analog reference signal are obtained.

In the above setting, when all values in a range of [0,Vwhite] are assigned to Vthresh in Formulas (3) and (4) and Tover in the following Formula (2) is evaluated, Vthresh causing Tover to be minimum is decided. Tover is a minimum time (count number) taken for AD conversion. FIG. 4 illustrates a relation between Vthresh and Tover.

When Vthresh causing Tover to be minimum is obtained, ΔSa in Formula (4) representing the inclination of the analog reference signal Vref-A, ΔSb in Formula (4) representing the inclination of the analog reference signal Vref-B, Ta_over in Formula (3) representing a saturation value of the AD converting unit 103A, and Tb_over in Formula (3) representing a saturation value of the AD converting unit 103B are dependently decided.

Tover obtained as described above is a minimum pulse number applied from the timing control circuit to the counter of the AD converting unit. In other words, as the timing control circuit is designed to transition to the next operation immediately after pulses are applied to the counter of the AD converting unit by Tover times, a useless counting operation can be prevented, and an operation time can be optimized. In other words, the effects by which power consumption is reduced and the operation speed increases are obtained.

$$T_{over} := \max(T_{a\_over}, T_{b\_over}) \qquad (2)$$

$$\left.\begin{array}{l} T_{b\_over} := \dfrac{V_{white}}{\Delta S_b} \\[6pt] T_{a\_over} := \dfrac{V_{thresh}}{\Delta S_a} \end{array}\right\} \qquad (3)$$

$$\left.\begin{array}{l} \Delta S_a := K_a \cdot \sigma \\[4pt] \Delta S_b := K_b \cdot \sqrt{\sigma^2 + V_{thresh}} \end{array}\right\} \qquad (4)$$

The digital compositing unit 108 composites a digital pixel signal Va obtained by finely quantizing the analog pixel signal with a high gain through the AD converting unit 103A with a digital pixel signal Vb obtained by roughly quantizing the analog pixel signal with a low gain through the AD converting unit 103B, and outputs the composite result.

The digital pixel signals Va and Vb input to the digital compositing unit 108 are digital signals which have been subjected to a correlated double sampling (CDS) process. CDS is a signal processing technique used to reduce reading noise of a pixel signal. Particularly, by detecting a difference in a voltage level between before and after signal charges of a pixel flow into a charge-voltage converting circuit through CDS, it is possible to obtain an output in which thermal noise (kTC noise) is reduced. The following Formula (5) represents a relation between AD conversion results Ta and Tb and the digital pixel signals Va and Vb when CDS is performed through an analog circuit (not shown).

$$\left.\begin{array}{l} V_a := T_a - 0 \\ V_b := T_b - 0 \end{array}\right\} \qquad (5)$$

Figure 5:
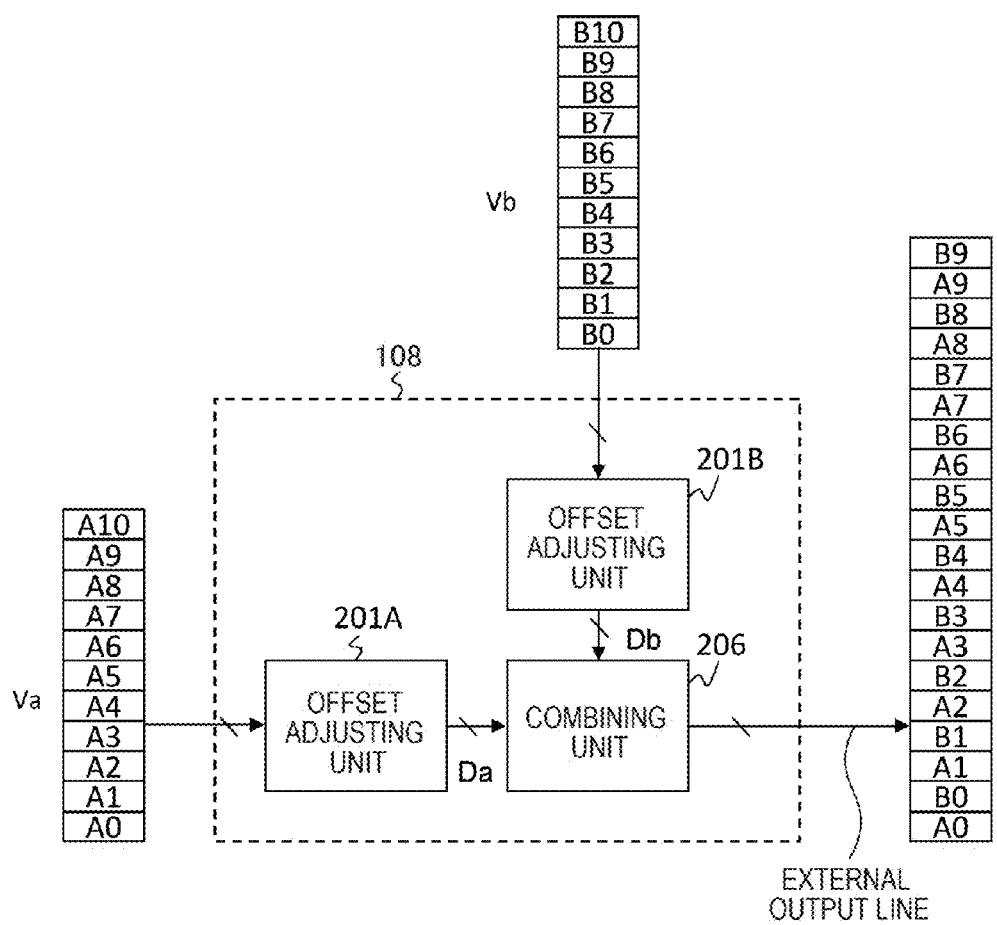
FIG. 5 is a block diagram illustrating a first configuration example of a digital compositing unit.

FIG. 5 illustrates a first configuration example of the digital compositing unit 108. In the example illustrated in FIG. 5, the digital compositing unit 108 includes offset adjusting units 201A and 201B and a combining unit 206. In the example illustrated in FIG. 5, the digital pixel signals Va and Vb are each 11-bit signals.

Each of the offset adjusting units 201A and 201B receives an 11-bit value, performs an offset adjustment for shifting a black level to a predetermined value (for example, 16), rewrites a value of 0 or less to 0 and a value of 1023 or more to 1023, and outputs a 10-bit value to the combining unit 206. Thus, valid data can be output to the outside through a bus with a minimal bit number width.

A general technique of performing statistical processing on signal values of optical black pixels (not shown) that are constantly light-shielded (for example, a method of obtaining an average value of pixels in an OPB region) is used as a technique of calculating a black level. In other words, each of the offset adjusting units 201A and 201B performs an adjustment so that a level of the average value becomes a value (for example, 16) representing a black level as an output value. For example, when the value representing the black level is set to 16, a value range of −16 to 1007 is encoded into 10-bit data of 0 to 1023, and output with a small negative level.

The following Formula (6) represents an offset adjusting process in the offset adjusting units 201A and 201B. In other words, the offset adjusting process is a process of calculating a difference between each of the digital pixel signals Va and Vb and the black level OPB.

$$\left. \begin{array}{l} D_a := V_a - OPB \\ D_b := V_b - OPB \end{array} \right\} \quad (6)$$

The combining unit 206 combines the digital pixel signals Va and Vb to be composited into a signal with a large bit width, and outputs the composited signal to an external output line. In the example illustrated in FIG. 5, each of the 11-bit signals Va and Vb is converted into a signal with a 20-bit width through the combining unit 206.

Figure 6:
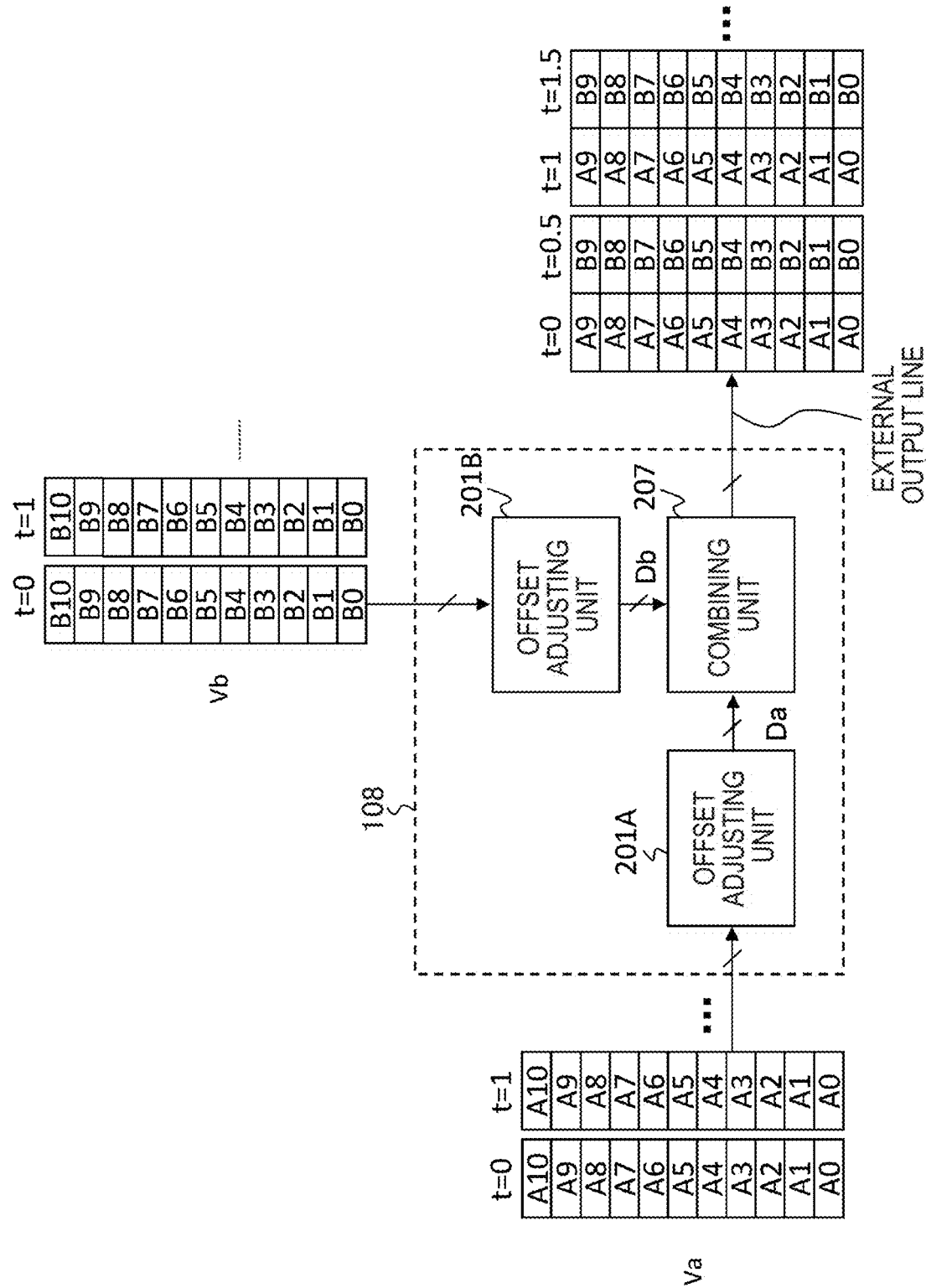
FIG. 6 is a block diagram illustrating a second configuration example of a digital compositing unit.

FIG. 6 illustrates a second configuration example of the digital compositing unit 108. In the example illustrated in FIG. 6, the digital compositing unit 108 includes offset adjusting units 201A and 201B and a combining unit 207. In the example illustrated in FIG. 6, each of the digital pixel signals Va and Vb is an 11-bit signal. Each of the offset adjusting units 201A and 201B receives an 11-bit value, performs an offset adjustment for shifting a black level to a predetermined value (for example, 16), and outputs a 10-bit value to the combining unit 207, similarly to the offset adjusting units 201A and 201B in the digital compositing unit 108 illustrated in FIG. 5. The combining unit 207 performs an interleaving compositing on the digital pixel signals Va and Vb using clocks which are twice as many as input clocks.

Figure 7:
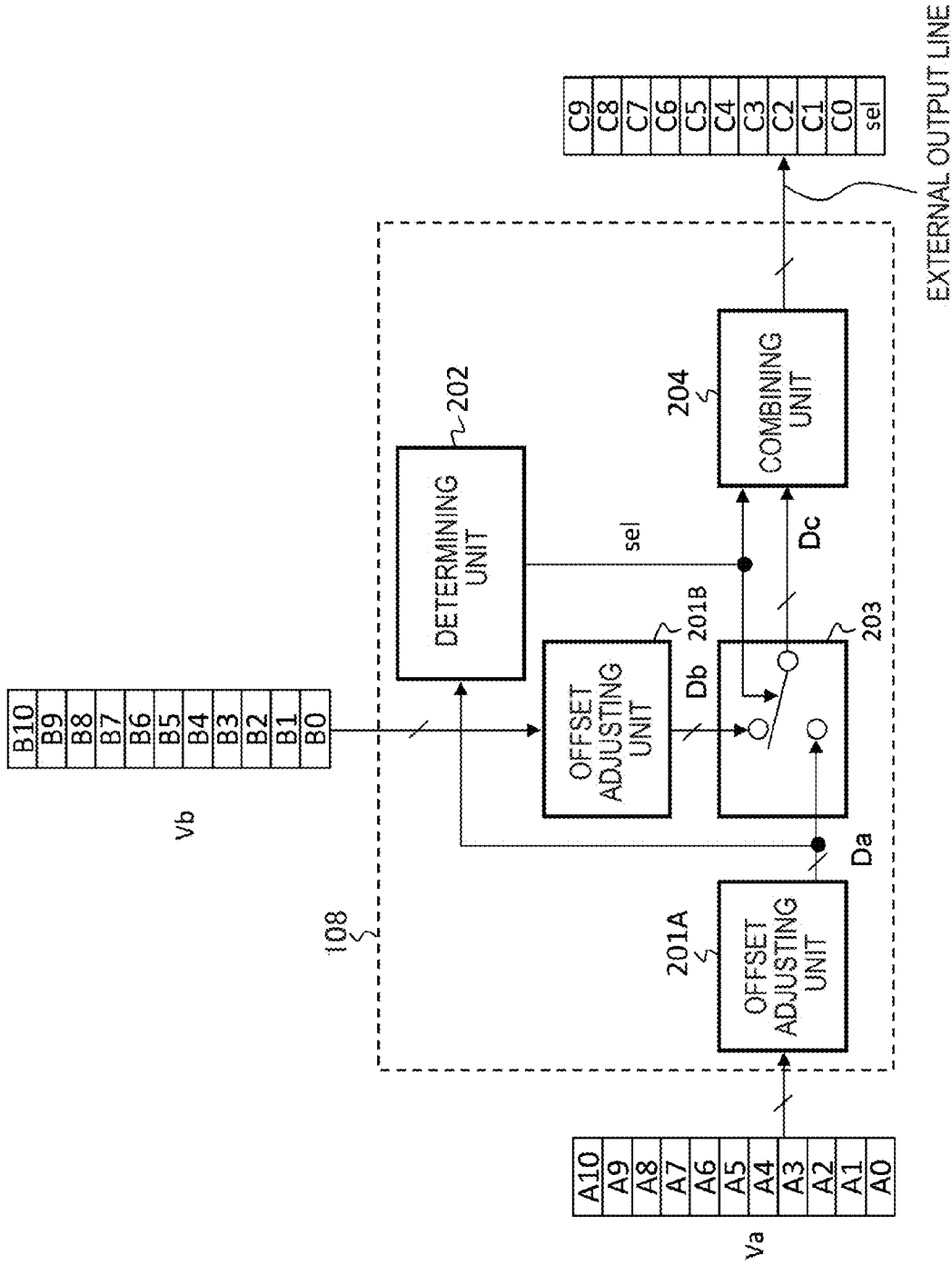
FIG. 7 is a block diagram illustrating a third configuration example of a digital compositing unit.

FIG. 7 illustrates a third configuration example of the digital compositing unit 108. In the example illustrated in FIG. 7, the digital compositing unit 108 includes offset adjusting units 201A and 201B, a determining unit 202, a selecting unit 203, and a combining unit 204. In the example illustrated in FIG. 7, each of the digital pixel signals Va and Vb is an 11-bit signal. Each of the offset adjusting units 201A and 201B receives an 11-bit value and performs an offset adjustment for shifting a black level to a predetermined value (for example, 16), similarly to the offset adjusting units 201A and 201B in the digital compositing unit 108 illustrated in FIG. 5.

The determining unit 202 compares a digital pixel signal Da with Dthresh serving as a threshold value, determines whether or not the digital pixel signal Da is less than the threshold value, and obtains a 1-bit selection signal sel. For example, when it is determined that the digital pixel signal Da is the threshold value or more, the selection signal sel has a value of "1," but when it is determined that the digital pixel signal Da is less than the threshold value, the selection signal sel has a value of "0."

The threshold value Dthresh is a digital value corresponding to a level of the level Vthresh of the analog signal of FIG. 3, and is a value obtained by calculating, for example, the following Formula (7).

$$D_{thresh}(V_{thresh} - V_{black})/\Delta S_a \quad (7)$$

The following Formula (8) represents a determining process in the determining unit 202. In other words, the determining process is a process of comparing the digital pixel signal Da of an A system with the threshold value Dthresh and deciding the value of the selection signal sel.

$$\left. \begin{array}{l} C_a := (D_a < D_{thresh}) \\ \begin{cases} sel := 0 & \text{if } C_a \text{ is true} \\ sel := 1 & \text{otherwise} \end{cases} \end{array} \right\} \quad (8)$$

The determining process is not limited to the method using the digital pixel signal Da of the A system but may be a method using the digital pixel signal Db of a B system, for example. In this case, the selection signal sel may be obtained by comparing the digital pixel signal Db of the B system with a threshold value having a level equivalent to the threshold value Ta_over of the A system. The equivalent level refers to the digital value of the B system corresponding to the digital value of the A system in which the analog pixel signal is almost the same level.

Based on the selection signal sel, the selecting unit 203 extracts the digital pixel signal Da when it is determined that the digital pixel signal Da is less than the threshold value, and extracts the digital pixel signal Db when it is determined that the digital pixel signal Da is the threshold value or more. The following Formula (9) represents a selecting process in the selecting unit 203. In other words, the selecting process is a process of selecting either the digital pixel signal Da of the A system or the digital pixel signal Db of the B system according to the value of the selection signal sel and deciding a digital pixel signal Dc.

$$\begin{cases} D_c := D_a & \text{if } sel = 0 \\ D_c := D_b & \text{otherwise} \end{cases} \quad (9)$$

The combining unit 204 combines the digital pixel signal Dc extracted by the selecting unit 203 with the selection signal sel into one word (an 11-bit signal), and outputs the combined one word to the external output line.

Figure 8:
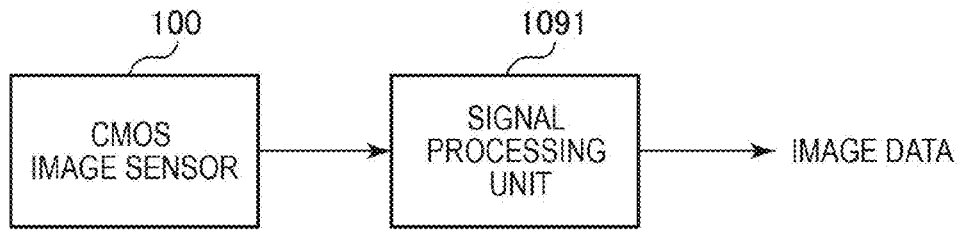
FIG. 8 is a block diagram illustrating a signal processing unit that receives an output of a CMOS image sensor.

FIG. 8 illustrates a signal processing unit 1091 that receives an output of the CMOS image sensor 100. The signal processing unit 1091 processes a signal imaged by the CMOS image sensor 100. When the digital compositing unit 108 of the CMOS image sensor 100 employs the configuration of FIG. 5 or 6, the signal processing unit 1091 performs the selecting process and the magnification correcting process and then performs general camera signal processing according to a flowchart of FIG. 9 which will be described later. When the digital compositing unit 108 of the CMOS image sensor 100 employs the configuration of FIG. 7, the signal processing unit 1091 performs the magnification correcting process and the general camera signal processing according to a flowchart of FIG. 10 which will be described later. The general camera signal processing refers to a process of converting a signal imaged by performing the white balance process, the de-mosaic process, the tone mapping process, the gamma correction process, or the like into image data.

Figure 9:
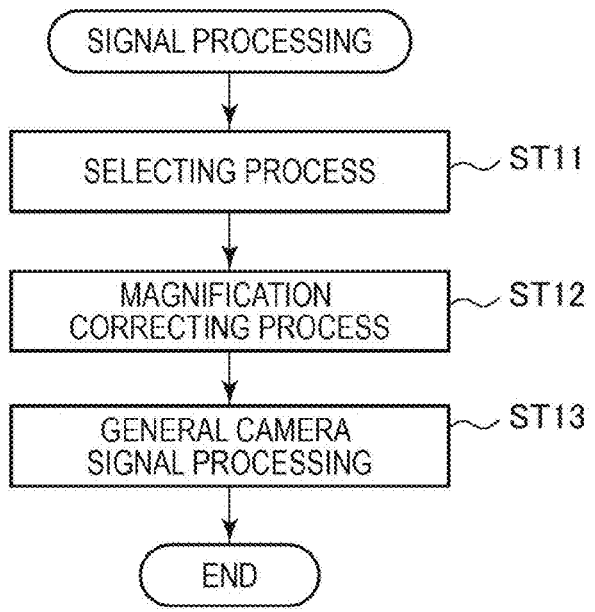
FIG. 9 is a flowchart illustrating a signal processing example of a signal processing unit.

FIG. 9 is a flowchart representing a signal processing example of the signal processing unit 1091 when the digital compositing unit 108 employs the configuration of FIG. 5 or 6. The imaging signal output from the digital compositing unit 108 having the configuration of FIG. 5 or 6 includes the digital pixel signal Da (corresponding to A0 to A9 of the output data of FIG. 5 or 6) and the digital pixel signal Db (corresponding to B0 to B9 of the output data of FIG. 5 or 6). In step ST11, the value of the digital pixel signal Dc is decided by Formula (9) according to the value of the selection signal sel obtained by Formula (8).

Next, in step ST12, the magnification correcting process is performed on each pixel signal Dc according to the value of the selection signal sel to obtain a value of a pixel signal D. The following Formula (10) represents the magnification correcting process. In other words, the magnification correcting process is a process of multiplying the digital pixel signal Dc by ΔSa or ΔSb according to the value of the selection signal sel and correcting a magnification rate.

$$\begin{cases} D := D_c \cdot \Delta S_a & \text{if } sel = 0 \\ D := D_c \cdot \Delta S_b & \text{otherwise} \end{cases} \quad (10)$$

After obtaining the pixel signal D on all pixels, in step ST13, the general camera signal processing is performed to obtain image data that is viewed as a digital photograph by a human being.

Figure 10:
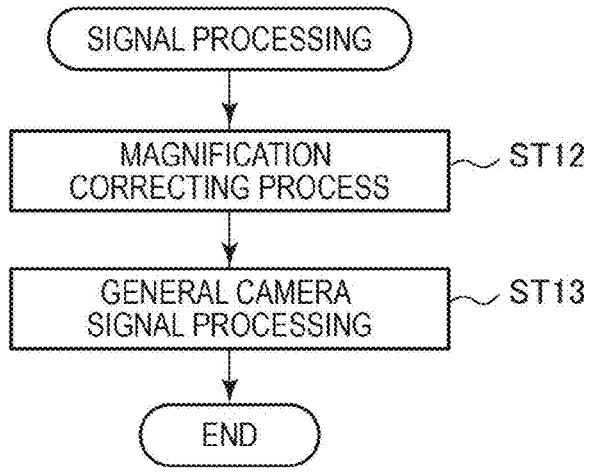
FIG. 10 is a flowchart illustrating another signal processing example of a signal processing unit.

FIG. 10 is a flowchart illustrating a signal processing example of the signal processing unit 1091 when the digital compositing unit 108 employs the configuration of FIG. 7. The imaging signal output from the digital compositing unit 108 having the configuration of FIG. 7 includes the digital pixel signal Dc (corresponding to C0 to C9 of the output data of FIG. 7) and the selection signal sel (corresponding to sel of the output data of FIG. 7).

In step ST12, similarly to step ST12 of the flowchart of FIG. 9, the magnification correcting process is performed on each pixel signal Dc according to the value of the selection signal sel to decide the value of the pixel signal D. After obtaining the pixel signal D on all pixels, in step ST13, the general camera signal processing is performed to obtain image data that is viewed as a digital photograph by a human being.

Further, in a transmission path between the image sensor 100 and the signal processing unit 1091, the amount of information may be further reduced using an information compression device and an information decompression device and then communicated.

The image sensor 100 and the signal processing unit 1091 may be mounted in a single device or different devices. In other words, the signal processing unit 1091 may be mounted in a digital processing processor (DSP), separately from the image sensor 100. The transmission path between the image sensor 100 and the signal processing unit 1091 is not limited to a direct connection, and may involve a computer or the Internet. In other words, storage transmission may be performed through a storage, a network, and the like.

Figure 27:
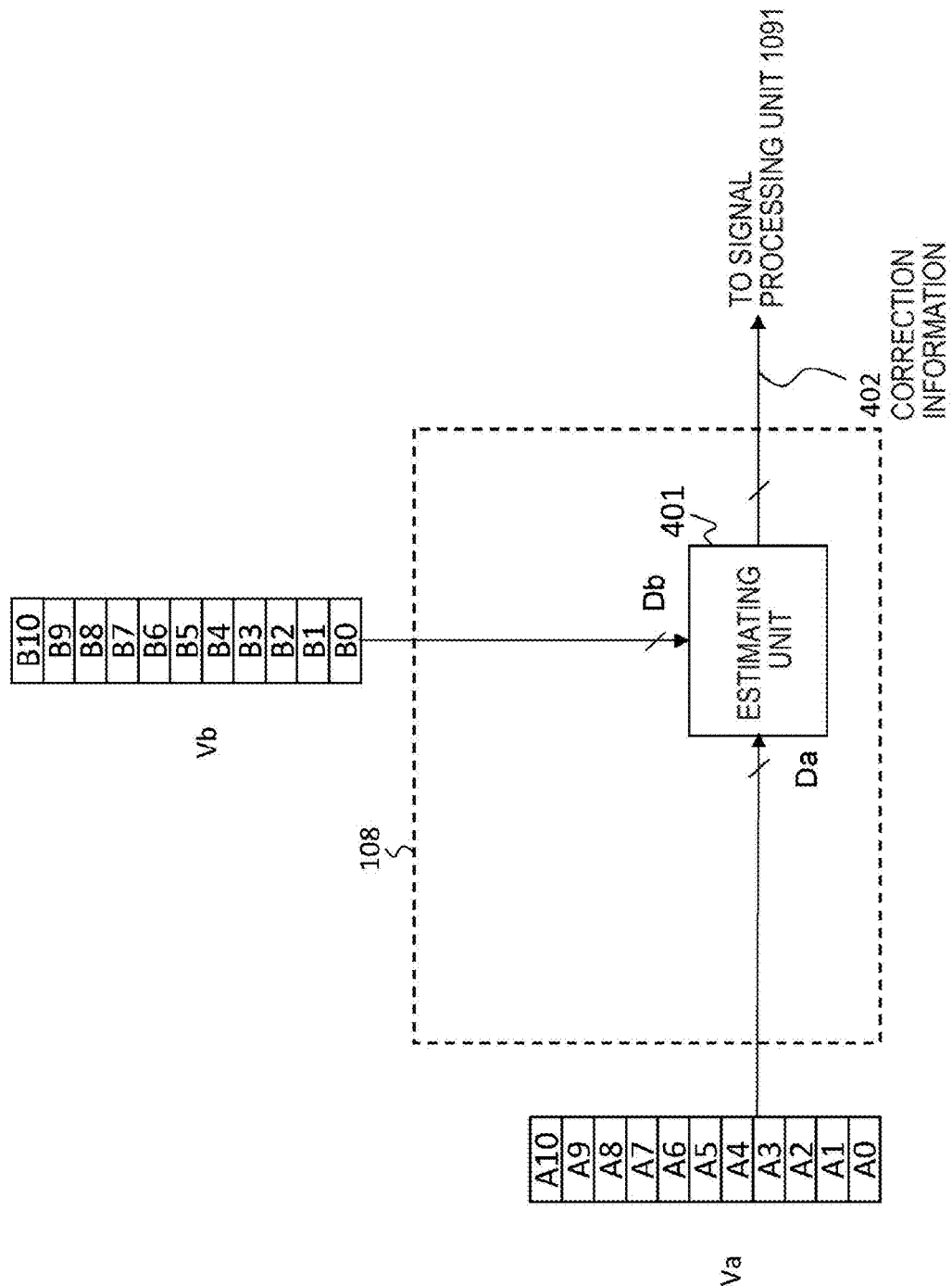
FIG. 27 is a block diagram illustrating another configuration example of a digital compositing unit further including an estimating unit.

FIG. 27 illustrates an example in which the digital compositing unit 108 is further provided with an estimating unit 401 that causes an analog gain to match a digital gain as accurately as possible. The estimating unit 401 receives a plurality of digital pixel signals Da and a plurality of digital pixel signals Db, and performs a calculation of estimating information corresponding to the inclinations of the analog reference signal Vref-A and the analog reference signal Vref-B from the received information. The estimated information is output to the signal processing unit 1091 of a subsequent stage as correction information 402.

The correction information 402 generated by the estimating unit 401 is used to more accurately perform a calculation of correcting a magnification rate through the magnification correcting process performed by the signal processing unit 1091. The correction information 402 is necessary because the reference signal generator 105A and the amplifier 105B are analog circuits, and thus a manufacturing error is likely to occur. For example, even when the analog circuit is designated such that the inclination of the analog reference signal is 10 electrons/STEP, an error such as 9.7 electrons/STEP is likely to be included, and it is difficult to manufacture an accurate analog-to-digital converter. If magnification correction is performed under the assumption of 10 electrons/STEP even when the inclination of the analog reference signal is inaccurate, for example, 9 electrons/STEP, a problem such as a color change shown in a resultant image occurs.

Figure 28:
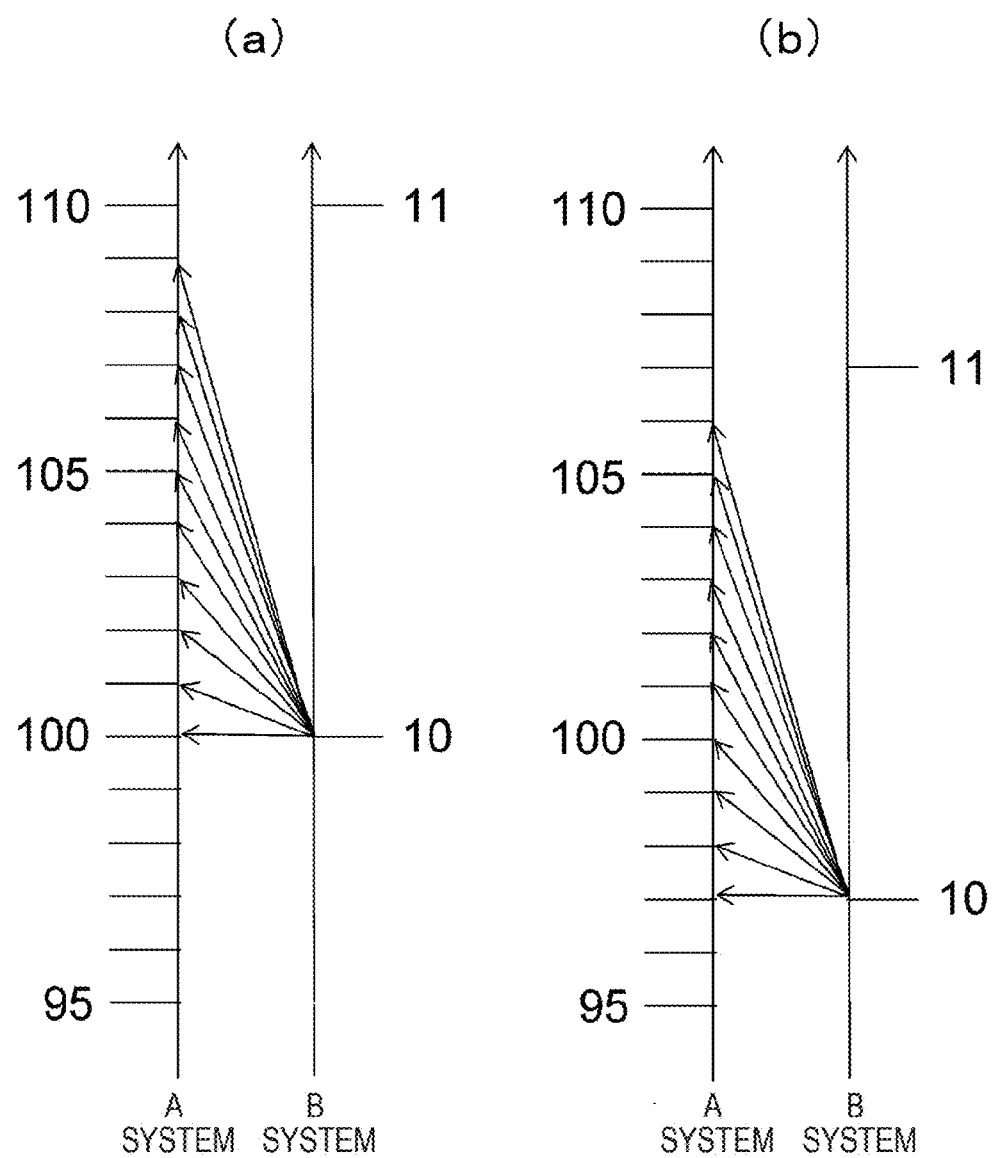
FIG. 28 is a diagram illustrating an example in which both of two analog-to-digital converters are accurate and an example in which at least one of the two analog-to-digital converters is inaccurate.

FIG. 28(a) illustrates an example in which both of the analog-to-digital converters are accurate, and FIG. 28(b) illustrates an example in which at least one of the two analog-to-digital converters is inaccurate. In this example, the inclination of the A system including one analog-to-digital converter is assumed to have 1 electron/STEP, and the inclination of the B system including the other analog-to-digital converter is assumed to have 10 electrons/STEP, that is, the two analog-to-digital converters are accurate. In other words, the digital value of the A system has a magnification rate 10 times greater than the digital value of the B system. For example, the value of the A system corresponding to 10 or more and less than 11 as the value of the B system in FIG. 28(a) is 100 or more and less than 110.

However, when the two analog-to-digital converters are inaccurate and the magnification rate in which the digital value of the A system is 9.7 times the digital value of the B system is given, the value of the A system corresponding to 10 or more and less than 11 as the value of the B system is 97 or more and less than 107 as illustrated in FIG. 28(b). At this time, the magnification rate can be accurately corrected to be equal as in FIG. 28(a) by converting the value of the A system through a correction value of about 100/97 times. Therefore, when a calculation of correcting the magnification rate through the magnification correcting process performed by the signal processing unit 1091 is performed using the value of 100/97 times as the correction information 402, more accurate correction can be performed.

When the distribution of the value of the digital pixel signal of the A system on the value of the digital pixel signal of the B system is measured and evaluated as the inaccurate distribution, a correction value for converting the digital pixel signal so that the accurate distribution corresponding to the value of the B system is made is preferably obtained as the correction information 402. The method of obtaining the correction value can be simply described as follows: the value of the A system corresponding to the value 10 of the B system is ideally 100 as illustrated in FIG. 28(a), but when the minimum value of the value of the A system corresponding to the value 10 of the B system is actually 97 as illustrated in FIG. 28(b), 100/97 times is obtained as the correction value by the ratio of the two values, but the method of obtaining the correcting value is not limited to this example.

Figure 11:
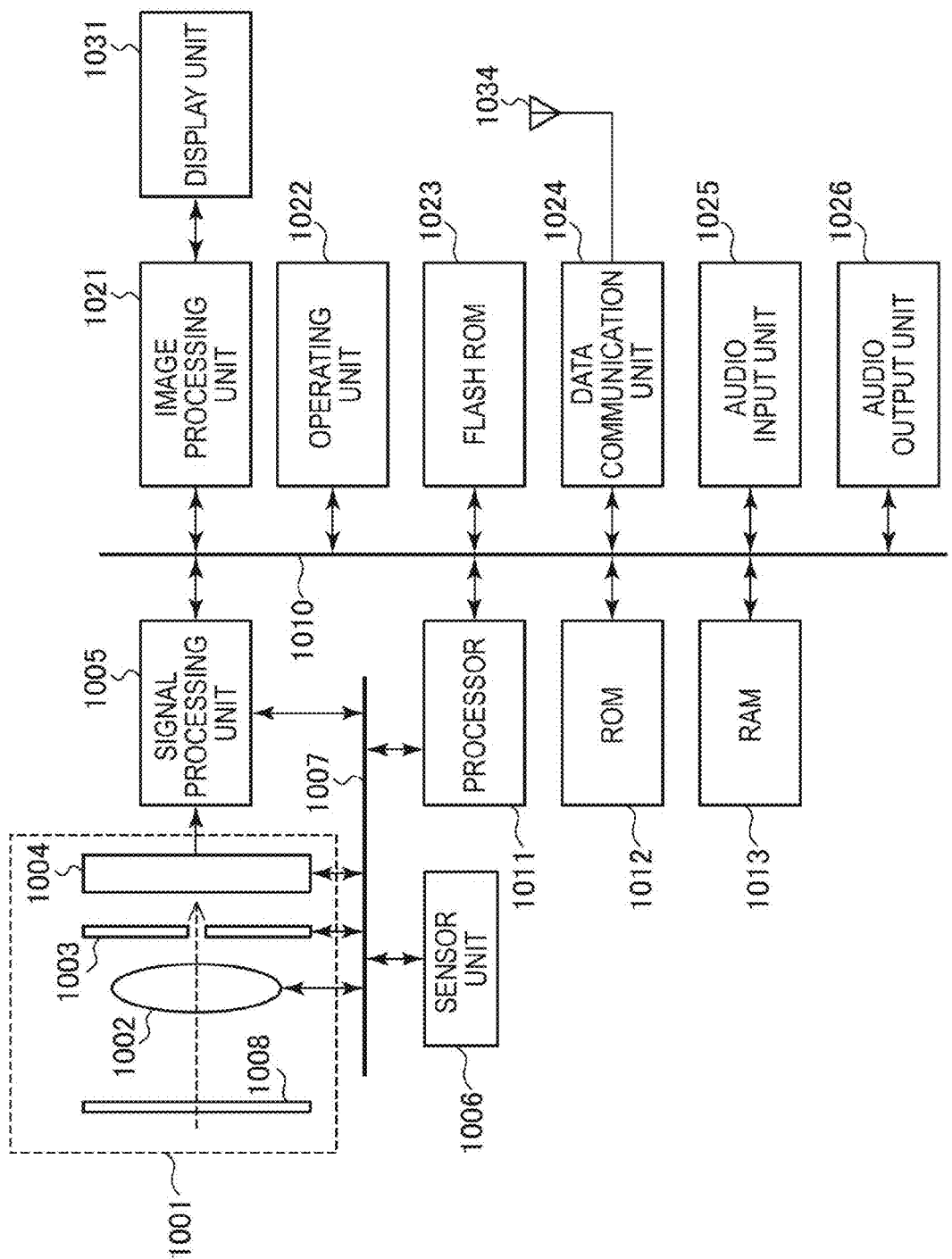
FIG. 11 is a diagram illustrating an example of a hardware configuration of an image display device.

FIG. 11 is a diagram illustrating an example of a hardware configuration of an image display device according to an embodiment. Here, a portable device is assumed as a concrete example of the image display device. The portable device includes an imaging unit 1001, a signal processing unit 1005, and a flash ROM 1023 for photography and includes an image processing unit 1021 and a display unit 1031 for image display. The portable device further includes a processor 1011 for performing overall control, a read only memory (ROM) 1012, and a random access memory (RAM) 1013.

The portable device further includes a sensor unit 1006 that acquires an acceleration, an angular speed position, a direction, or the like. The portable device further includes a data communication unit 1024 and an antenna 1034 for data communication. The portable device further includes an audio input unit 1025 and an audio output unit 1026 for audio input and output. In addition, the portable device includes an operating unit 1022 through which a user performs an operation.

The imaging unit 1001 is a photoelectric converter that includes the CMOS image sensor 1004 (corresponding to the CMOS image sensor 100 of FIG. 8) serving as an imaging element, and forms an image on an imaging plane through an optical block. The imaging unit 1001 includes an optical filter 1008, an optical lens 1002, an optical diaphragm 1002, and the like as the optical block.

The signal processing unit 1005 (corresponding to the signal processing unit 1091 of FIG. 8) performs a process of converting an image signal imaged by the imaging unit 1001 into image data through the camera signal processing such as the white balance process, the de-mosaic process, the tone mapping process, and the gamma correction. The flash ROM 1023 records the image data processed by the signal processing unit 1005.

The image processing unit 1021 is a graphic processor with a function of rendering the image data by performing the coordinate transformation on the image data. The display unit 1031 displays the image data rendered by the image processing unit 1021, and includes a liquid crystal display device (LCD), for example.

The processor 1011 undertakes processing of the whole portable device, and uses the RAM 1013 as a working area. A program for controlling the imaging unit 1001, a program of the signal processing unit 1005, and a program for executing recording control and playback control of image data or the like are written in the ROM 1012.

The data communication unit 1024 includes a modem circuit that performs data communication with another device with a data communication function. The antenna 1034 transmits or receives a radio frequency signal for data communication by a wireless scheme. The data communication may be performed by a wired scheme using a copper wire or an optical fiber. The audio input unit 1025 receives an audio input provided from the user, and the audio output unit 1026 supplies the user with an audio output. The operating unit 1022 is an operation device that receives an operation input from the user, and includes a shutter button, a numerical key pad, a directional key, a touch panel, and the like.

[Detailed Configuration Example of CMOS Image Sensor]

Figure 12:
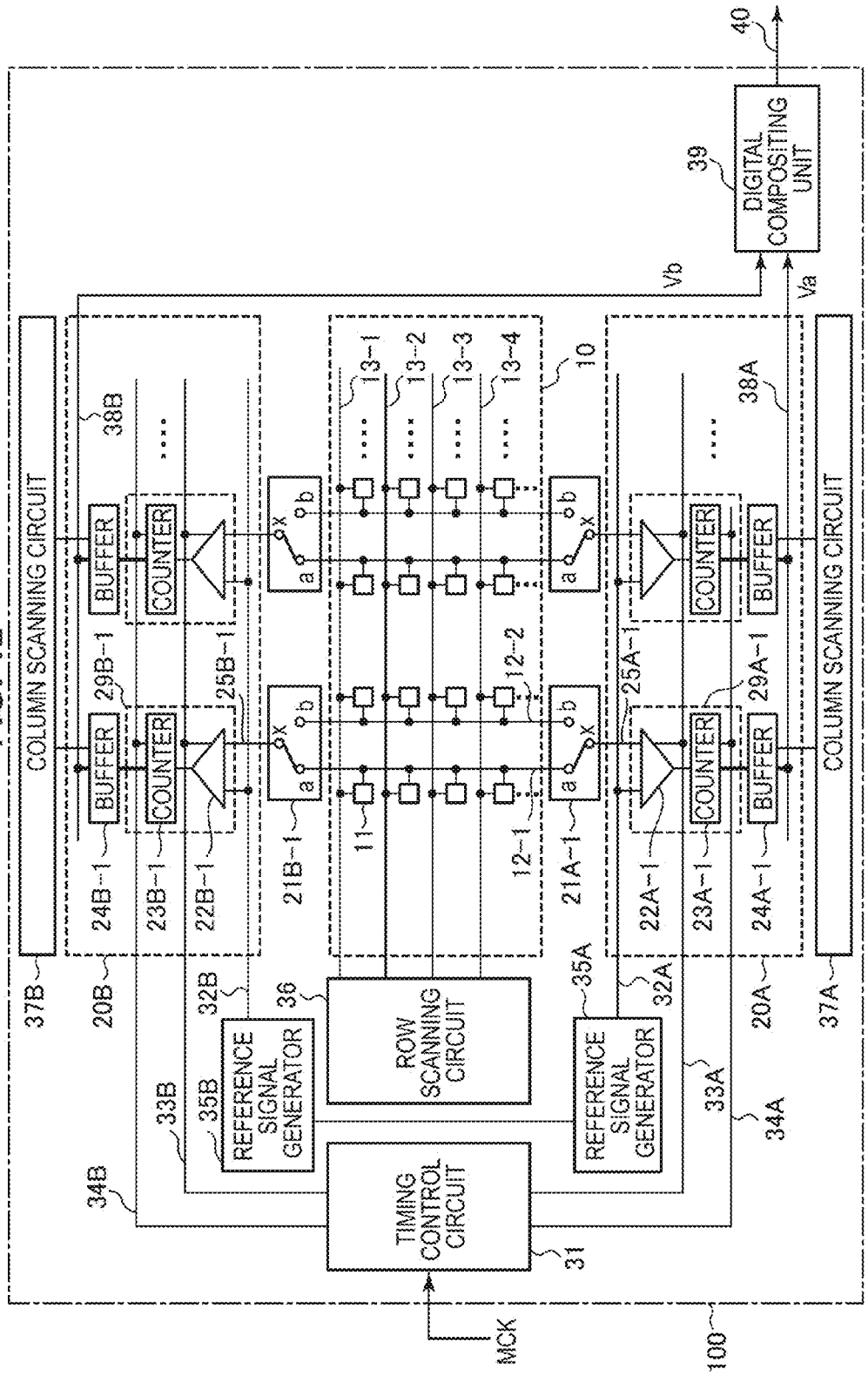
FIG. 12 is a diagram illustrating a detailed configuration example of a CMOS image sensor.

FIG. 12 illustrates a detailed configuration of the CMOS image sensor 100. The CMOS image sensor 100 includes a pixel array unit 10 (corresponding to the pixel array unit 101 of FIG. 1) in which the unit pixels 11 are two-dimensionally arranged in the form of a matrix, a peripheral driving system for driving each pixel 11 of the pixel array unit 10, and a signal processing system. A timing control circuit 31, a reference signal generator 35, a row scanning circuit 36, a column scanning circuit 37, a column AD unit 20, a multiplexer 21 (corresponding to the multiplexers 102A and 102B of FIG. 1), and a digital compositing unit 39 (corresponding to the digital compositing unit 108 of FIG. 1) are disposed as a peripheral driving system and a signal processing system. The driving system and the signal processing system may be integrated on the same semiconductor substrate (chip) as the pixel array unit 10 or may be mounted on different semiconductor substrates and connected to the pixel array unit 10 through multi-chip mounting or stacking mounting.

The unit pixel 11 is a photoelectric converting element, and outputs a pixel signal according to a received light quantity. The output of the unit pixel 11 is controlled by a row control line 13 (13-1 to 13-n). The row scanning circuit 36 performs control such that pixel signals of the unit pixels 11 of any one row are output. The pixel signal output from the unit pixel 11 is transferred to a vertical signal line 12 (12-1 and 12-2), then selected by a multiplexer (switch) 21, and subjected to analog-to-digital conversion by the column AD unit 20. The multiplexer 21 selectively connects a terminal x to either a terminal a or a terminal b to transfer the pixel signal. The selection is controlled by the timing control circuit 31.

The column AD unit 20 includes AD converters 29 (corresponding to the AD converting units 103A and 103B of FIG. 1) which are arranged in columns. The AD converter 29 compares a level of a pixel signal 25 with a level of a reference signal 32 through a comparator 22 (corresponding to the analog comparators 106A and 106B of FIG. 1), and applies a binary result to the counter circuit 23 (corresponding to the digital counters 107A and 107B of FIG. 1). The comparator 22 includes an auto zero circuit using a PSET signal 33 as a trigger, and causes an offset which is a level difference between the pixel signal 25 and the reference signal 32 to be zero. Basically, the offset is caused to be zero, but a predetermined small offset may be applied so that the reference signal intersects with the pixel signal and an output of the comparator 22 is inverted.

The counter circuit 23 receives a counter control signal 34, a counter reset, a counter clock, and a count direction from the timing control circuit 31, and performs a counting operation. The counter clock is masked by the output of the comparator 22, and a digital value according to the level of the pixel signal 25 is obtained.

The reference signal generator 35 (corresponding to the reference signal generator 105A and the amplifier 105B of FIG. 1) generates the reference signal 32 that monotonically decreases at the time of measurement.

The bus buffer 24 controls an output, and outputs a value to a horizontal output line 38 according to a selection signal of the column scanning circuit 37. A bus buffer with a latch is desirable since an AD conversion operation and a transfer operation can be performed in parallel, but a latch function is not essential. In this embodiment, the bus buffer 24 is described as the bus buffer with the latch. The bus buffer with the latch is different in purpose from a memory which is an essential element in a time division scheme of a related art. The bus buffer 24 is provided to cause an AD conversion operation and a conversion value output operation to be performed in parallel regardless of an intrinsic operation of AD conversion, and outputs an AD conversion value of a previous row at the time of AD conversion of a current row.

The digital compositing unit 39 simultaneously receives the values from the horizontal output lines 38 of the two systems, performs a digital compositing process on the received values, and outputs the process result to an external output line 40.

The timing control circuit 31 controls an overall operation sequence of the CMOS image sensor using a master clock MCK as a reference of an operation timing.

[Configuration Example of Unit Pixel]

Figure 13:
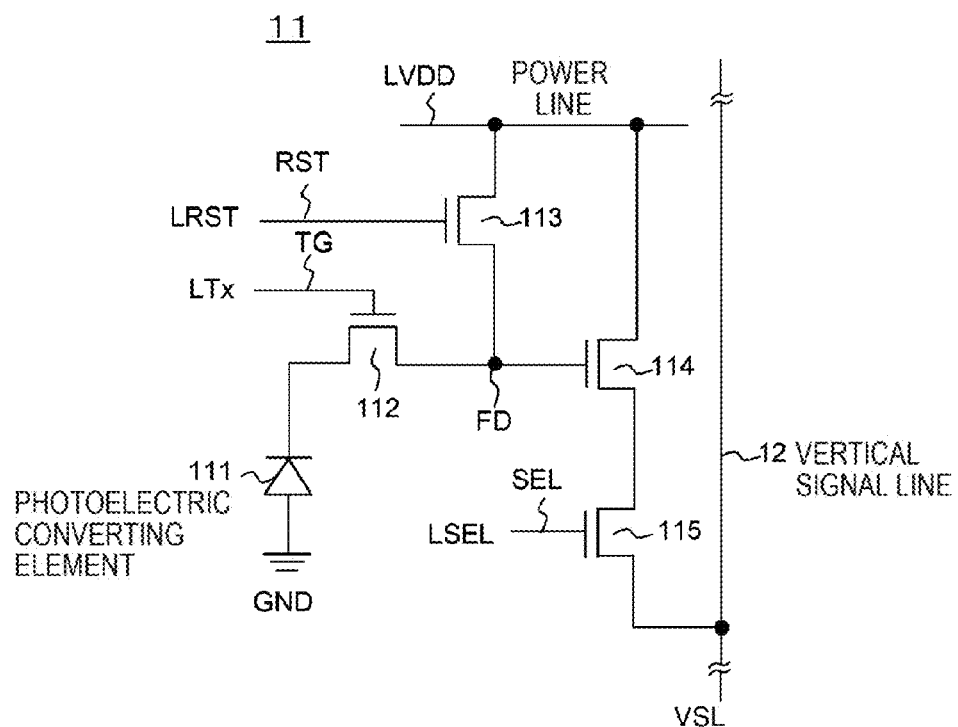
FIG. 13 is a diagram illustrating a configuration example of a unit pixel.

FIG. 13 illustrates a configuration example of the unit pixel 11. For example, the unit pixel 11 includes a photo-diode 111 as a photoelectric converting element. The unit pixel 11 includes four transistors, that is, a transfer transistor 112 serving as a transfer element, a reset transistor 113 serving as a reset element, an amplifying transistor 114, and a selecting transistor 115 as active elements with respect to one photo-diode 111.

The photo-diode 111 performs photoelectric conversion of converting incident light into charges (here, electrons) of an amount according to a light quantity thereof. The transfer transistor 112 is connected between the photo-diode 111 and a floating diffusion FD serving as an output node. The transfer transistor 112 transfers the electrons which have been subjected to the photoelectric conversion by the photo-diode 111 serving as the photoelectric converting element when a driving signal TG is applied to a gate (a transfer gate) of the transfer transistor 112 through the transfer control line LTx.

The reset transistor 113 is connected between a power line VLDD and the floating diffusion FD. The reset transistor 113 resets potential of the floating diffusion FD to potential of the power line LVDD when a reset RST is applied to a gate of the reset transistor 113 through a reset control line LRST.

A gate of the amplifying transistor 114 is connected to the floating diffusion FD. The amplifying transistor 114 is connected to vertical signal line 12 through a selecting transistor 115, and configures a source follower together with a constant current source outside the pixel. Further, a control signal (an address signal or a selecting signal) SEL is applied to a gate of the selecting transistor 115 through the selection control line LSEL to turn on the selecting transistor 115.

When the selecting transistor 115 is turned on, the amplifying transistor 114 amplifies the potential of the floating diffusion FD, and outputs a voltage according to the potential to the vertical signal line 12. The voltage (analog pixel signal) output from each pixel is output to the column AD unit 20 (see FIG. 12) through the vertical signal line 12. In this implementation example, the multiplexer 21 is used between the vertical signal line 12 and the column AD unit 20.

For example, since the control lines are connected to the gates of the transfer transistor 112, the reset transistor 113, and the selecting transistor 115 in units of rows, the above-described operation is simultaneously performed in parallel on pixels of one row.

The reset control line LRST, the transfer control line LTx, and the selection control line LSEL wired in the unit pixel unit 11 are wired as a set in units of rows in a pixel array. The reset control line LRST, the transfer control line LTx, and the selection control line LSEL are driven by the row scanning circuit 36 serving as a pixel driving unit.

[Configuration Example of Comparator]

Figure 14:
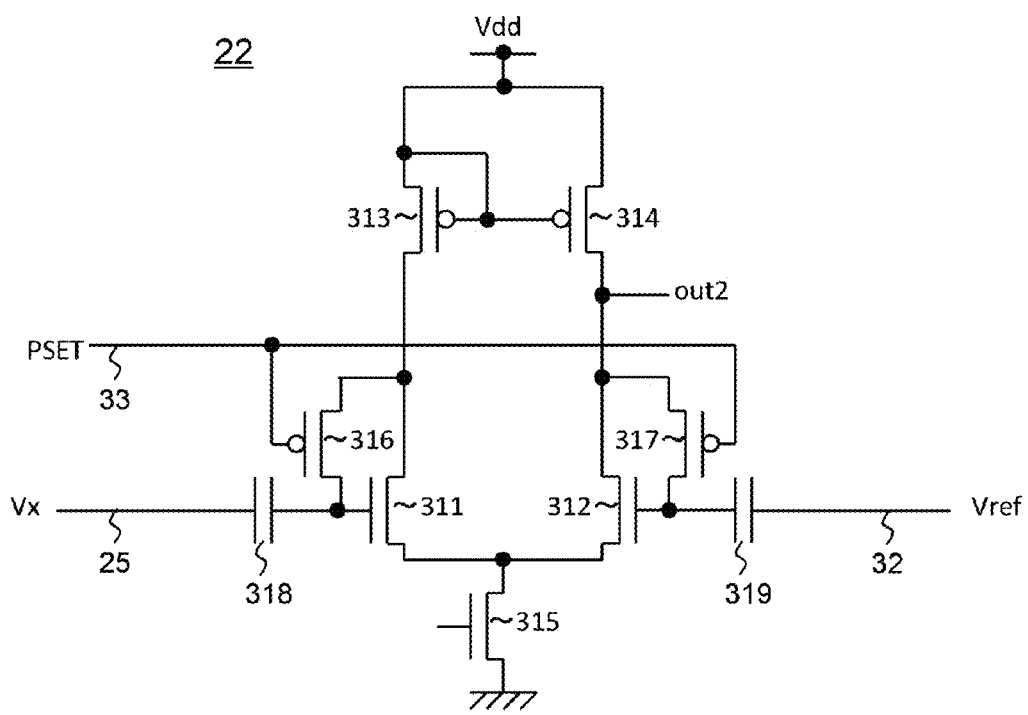
FIG. 14 is a diagram illustrating a configuration of a comparator.

FIG. 14 illustrates a configuration example of the comparator 22. The comparator 22 includes a differential comparator having a differential amplifier as a basic configuration. Referring to FIG. 14, the differential amplifier includes a pair of input transistors 311 and 312 of Nch. whose sources are connected commonly, a pair of transistors 313 and 314 of Pch. which are connected between the gates of the pair of input transistors 311 and 312 and a power source VDD and include gates which are commonly connected, and a current source transistor 315 of Nch. which is connected between a source common connection node of the pair of input transistors 311 and 312 and a ground.

In the differential amplifier, transistors 316 and 317 of Pch. are connected between the gates and the drains of the pair of input transistors 311 and 312, respectively. The transistors 316 and 317 function as reset units which are turned on when a reset pulse PSET of a low active is applied to a gate thereof, cause the gates and the drains of the pair of input transistors 311 and 312 to be short-circuited, and reset capacitors 318 and 319 so that each of voltages of the gates of the pair of transistors 311 and 312, that is, each of voltages of two input terminals of the comparator 22, has an inverted level of an output. In this way, an operation range which will be described later can be adjusted. In addition, by causing the transistors 316 and 317 to differ in the size, an inverted level of an output to be reset may deviate somewhat. This is known as a technique of inverting the output of the comparator 22 during the AD conversion operation.

The gates of the pair of input transistors 311 and 312 are connected to one terminals of the capacitors 318 and 319, respectively. The capacitors 318 and 319 give an offset to an input voltage to adjust an operation range which will be described later. The other terminal of the capacitor 318 is connected to the column signal line 12 through which an analog pixel signal Vx output from each unit pixel 11 of the pixel array unit 10 is transferred. The other terminal of the capacitor 319 is connected to a reference signal line 32 through which an analog reference signal Vref generated by the reference signal generator 35 is transferred.

In the comparator 22 illustrated in FIG. 14, the reset pulse PSET is activated (a low active) immediately before a comparison of the analog pixel signal Vx and the analog reference signal Vref starts. As a result, the transistors 316 and 317 are turned on, the gates and the drains of the pair of input transistors 311 and 312 are short-circuited, and operation points of the pair of input transistors 311 and 312 are reset to a drain voltage.

At this operation point, an offset component of two input terminal voltages of the differential amplifiers, that is, an offset component of gate voltages of the pair of input transistors 311 and 312 (a DC offset of the analog pixel signal Vx and the analog reference voltage Vref and an offset caused by a difference in the threshold value between the pair of input transistors 311 and 312) are almost canceled. In other words, the two input terminal voltages of the differential amplifiers become almost the same as each other (an auto zero operation).

Through this auto zero operation, the operation range is adjusted so that a comparator configured with a transistor is operated at an effectively operable voltage level when a comparison of the analog pixel signal Vx and the analog reference signal Vref is performed. The comparator 22 outputs a binary result (out2) representing a magnitude relation between the analog pixel signal Vx and the analog reference signal Vref.

Figure 15:
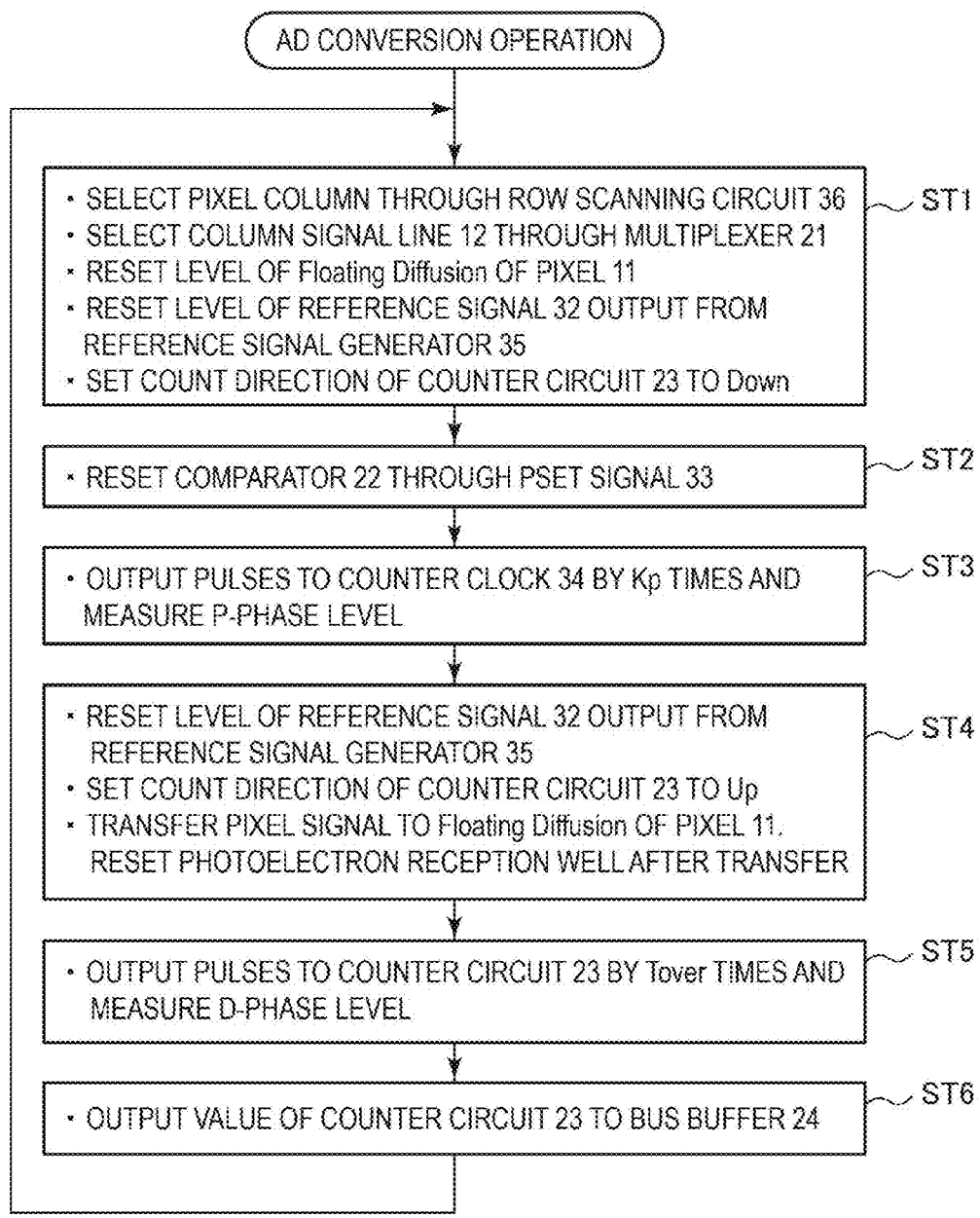
FIG. 15 is a flowchart illustrating the flow of an AD conversion operation controlled by a timing control circuit.
Figure 16:
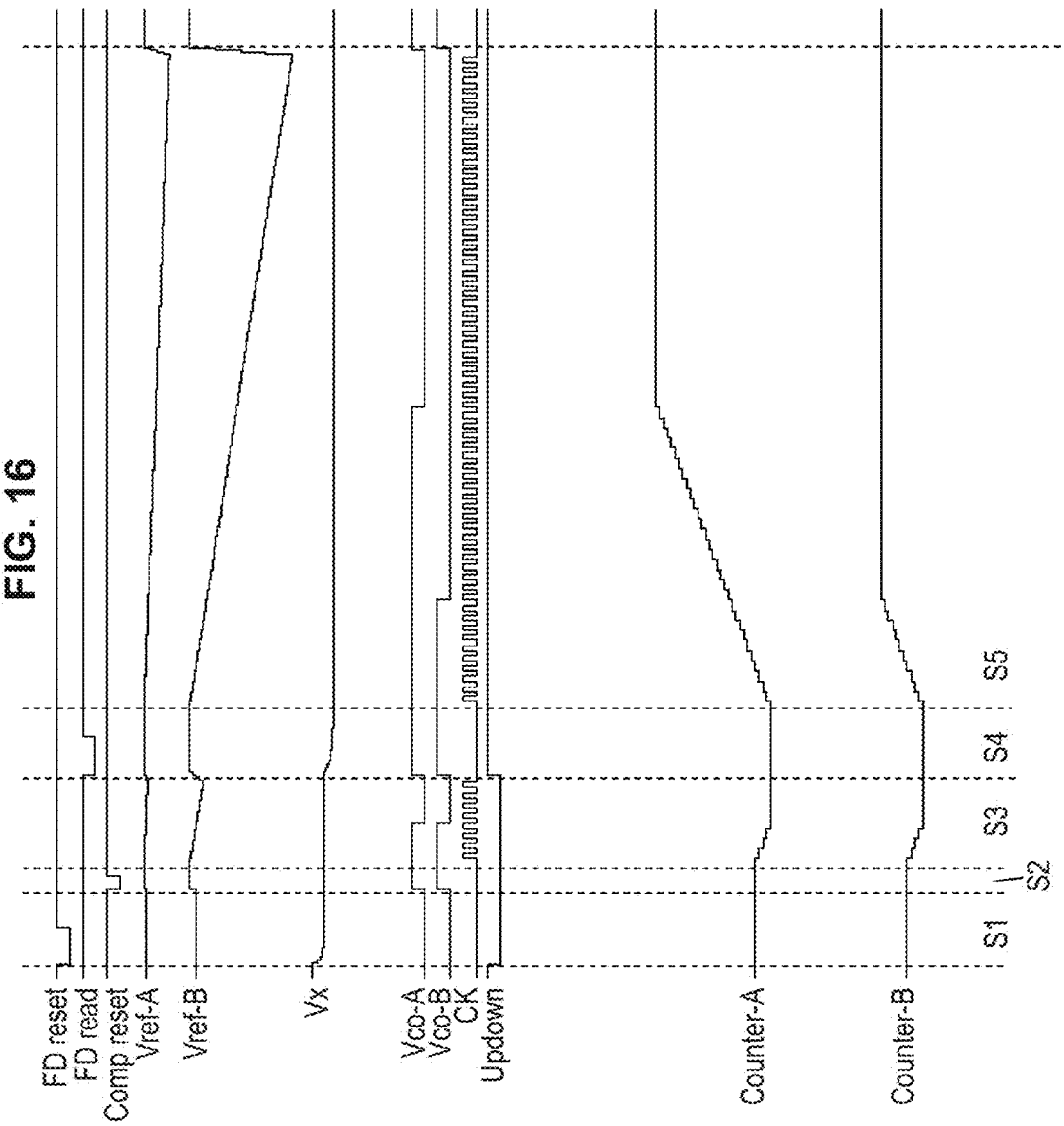
FIG. 16 is a waveform chart of an example (when input brightness is low and Vx is small) of an AD conversion operation obtained by an operation of a timing control circuit.
Figure 17:
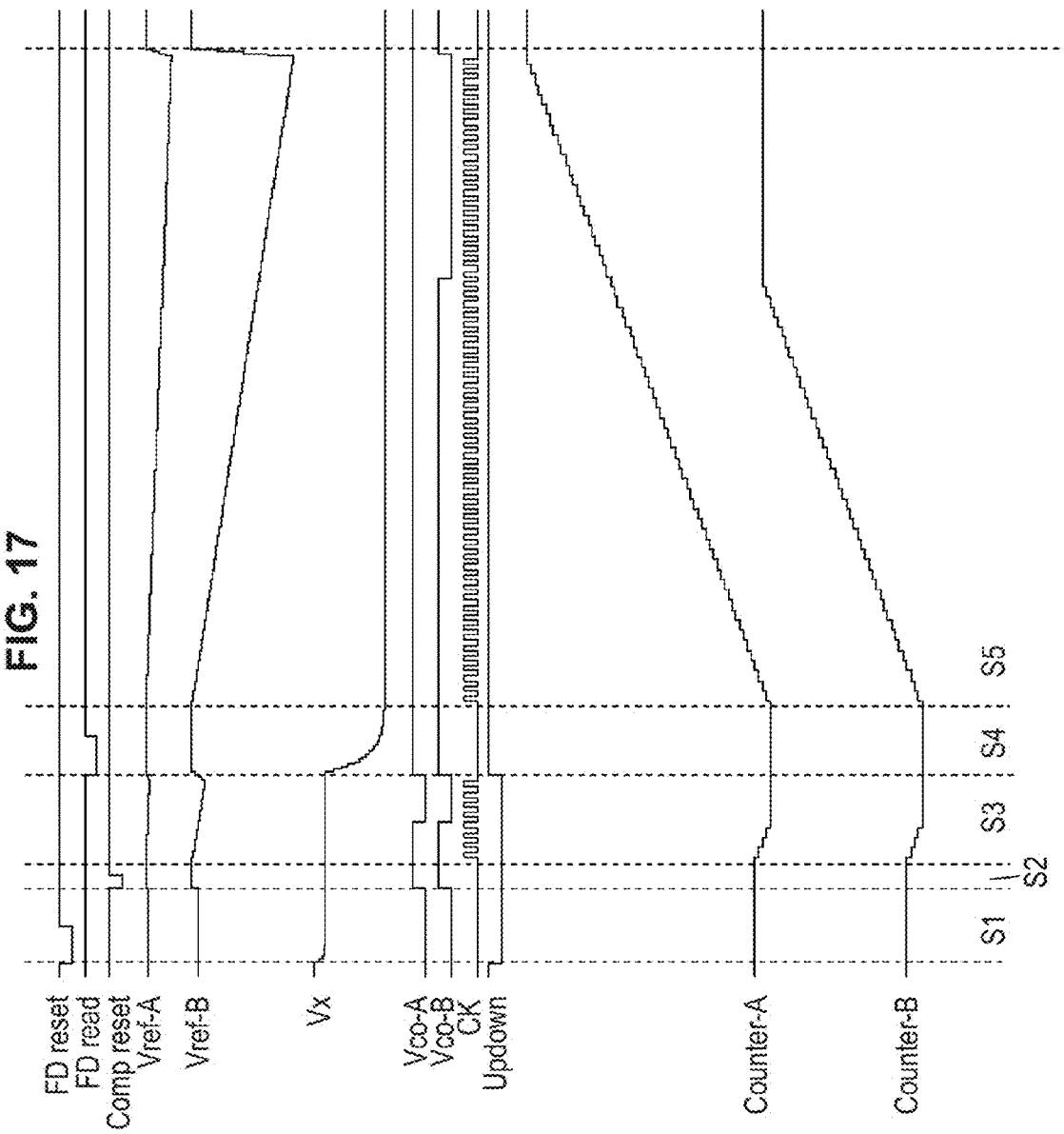
FIG. 17 is a waveform chart of an example (when input brightness is high and Vx is large) of an AD conversion operation obtained by an operation of a timing control circuit.

The flow of the AD conversion operation controlled by the timing control circuit 31 will be described with reference to a flowchart of FIG. 15. FIGS. 16 and 17 are waveform charts illustrating an example of an AD conversion operation obtained by an operation of the timing control circuit 31. FIG. 16 illustrates an example in which input brightness is low and Vx is small, and FIG. 17 illustrates an example in which the input brightness is high and Vx is large. 51 to S5 of FIGS. 16 and 17 correspond to steps ST1 to ST5 of FIG. 15, respectively.

"FD reset" represents a state of a signal line for resetting the level of the floating diffusion FD of the pixel 11. "FD read" represents a state of a signal line for controlling charge transfer to the floating diffusion FD of the pixel 11. "Vref-A" represents potential of an analog reference signal 32A. "Vref-B" represents potential of an analog reference signal 32B. "Vx" represents potential of the analog pixel signal 25.

"Vco-A" represents an output level of the comparator 22-A. "Vco-B" represents an output level of the comparator 22-B. "CK" represents a counter clock (clock pulse) given through the counter control signal 34, and "Updown" represents a counter direction given through the counter control signal 34. "Counter-A" represents an internal count value of the counter circuit 23-A. "Counter-B" represents an internal count value of the counter circuit 23-B.

In step ST1, the following operation is performed. In other words, the row scanning circuit 36 selects a predetermined pixel column of the pixel array unit 10, and the multiplexer 21 selects a predetermined column signal line 12. Further, the level of the floating diffusion FD of the pixel 11 is reset, the level of the analog reference signal 32 output from the reference signal generator 35 is reset, and the count direction of the counter circuit 23 is set to "down."

Next, in step ST2, the comparator 22 is reset by the PSET signal 33. Next, in step ST3, the counter clock CK is output to the counter clock 34 by Kp times, and a P-phase level (the reset level of the pixel 11) is measured. In this case, at a point in time at which the analog pixel signal Vx intersects with the analog reference signal Vref, the counter clock is masked by the output of the comparator 22, and the counter circuit 23 stops its counting operation.

Next, in step ST4, the following operation is performed. In other words, the level of the analog reference signal 32 output from the reference signal generator 35 is reset. Further, the count direction of the counter circuit 23 is set to "up." The analog pixel signal is transferred to the floating diffusion FD of the pixel 11. After the transfer, a photoelectron reception well is reset.

Next, in step ST5, the counter clock CK is output to the counter circuit 23 by Tover times, and a D-phase level is measured. In this case, at a point in time at which the analog pixel signal Vx intersects with the analog reference signal Vref, the counter clock is masked by the output of the comparator 22, and the counter circuit 23 stops its counting operation.

The result of the count value represents "the D-phase level-the P-phase level" by the measurement of the P-phase level based on the counting down of the counter circuit 23 and the measurement of the D-phase level based on the counting up of the counter circuit 23, and represents the digital pixel signal of each pixel having no variation which has been subjected the CDS. The following Formula (11) represents a relation between AD conversion results Ta_p, Ta_d, Tb_p, and Tb_d and the digital pixel signal Va and Vb when AD conversion is performed twice for the P phase and the D phase and the CDS is digitally performed on the difference in the voltage level as described above.

$$\left.\begin{aligned} V_a &:= T_{a\_d} - T_{a\_p} \\ V_b &:= T_{b\_d} - T_{b\_p} \end{aligned}\right\} \quad (11)$$

Next, in step ST6, the count value of the counter circuit 23 is output to the bus buffer 24. In the AD conversion operation controlled by the timing control circuit 31, an operation of steps ST1 to ST6 described above is repeatedly performed.

Figure 18:
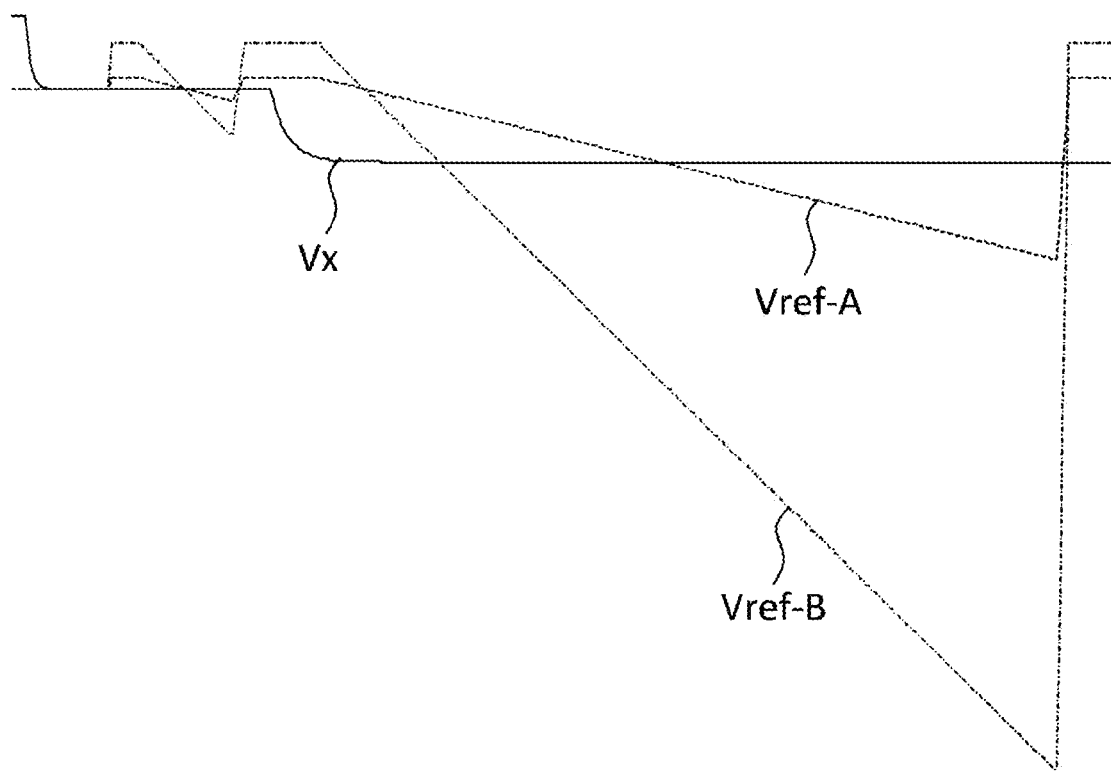
FIG. 18 is a diagram illustrating an example in which input brightness is low, Vx is small, and both of an analog reference signal Vref-A with a small inclination and an analog reference signal Vref-B with a large inclination intersect with an analog pixel signal Vx.

When the input brightness is low and Vx is small, both of the analog reference signal Vref-A with a small inclination and the analog reference signal Vref-B with a large inclination intersect with the analog pixel signal Vx when the D-phase level is measured (see FIG. 18). Thus, in this case, the counter circuits 23A and 23B differ in a quantization step width, but the count values thereof represent valid digital pixel signals.

Figure 19:
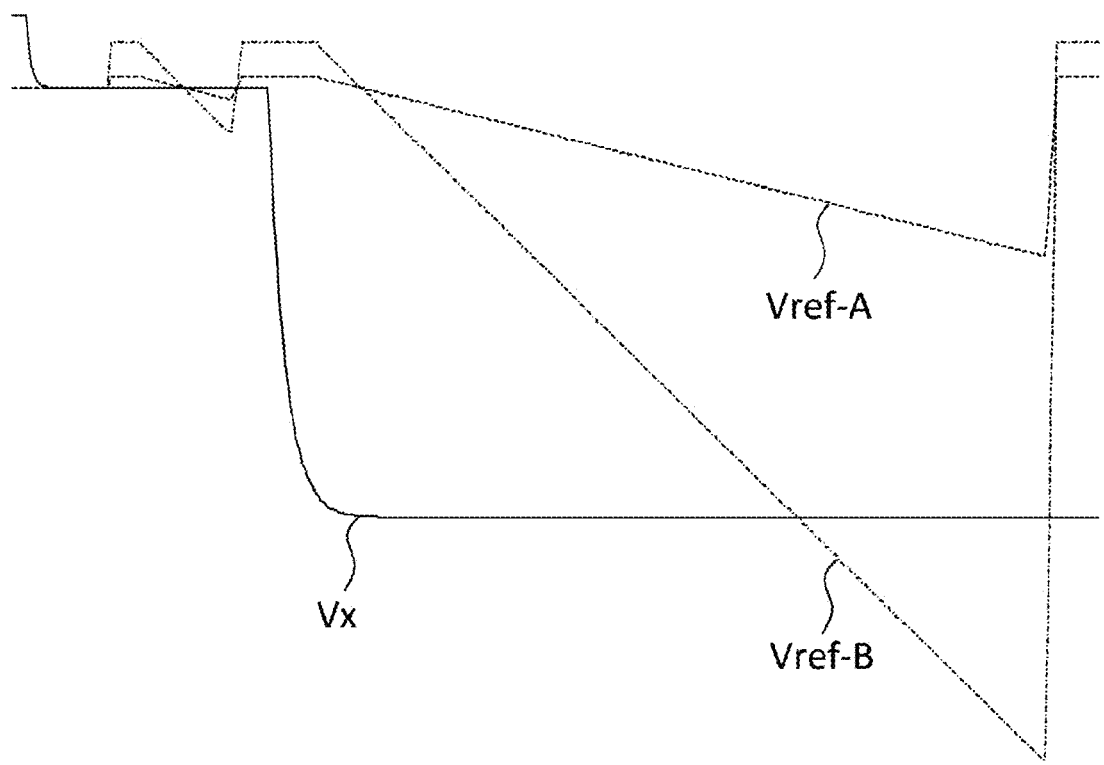
FIG. 19 is a diagram illustrating an example in which input brightness is high, Vx is large, and an analog reference signal Vref-B with a large inclination intersects with an analog pixel signal Vx.

On the other hand, when the input brightness is high and Vx is large, the analog reference signal Vref-B with a large inclination intersects with the analog pixel signal Vx when the D-phase level is measured (see FIG. 19). Thus, in this case, the count value of the counter circuit 23B represents the effective digital pixel signal.

Figure 20:
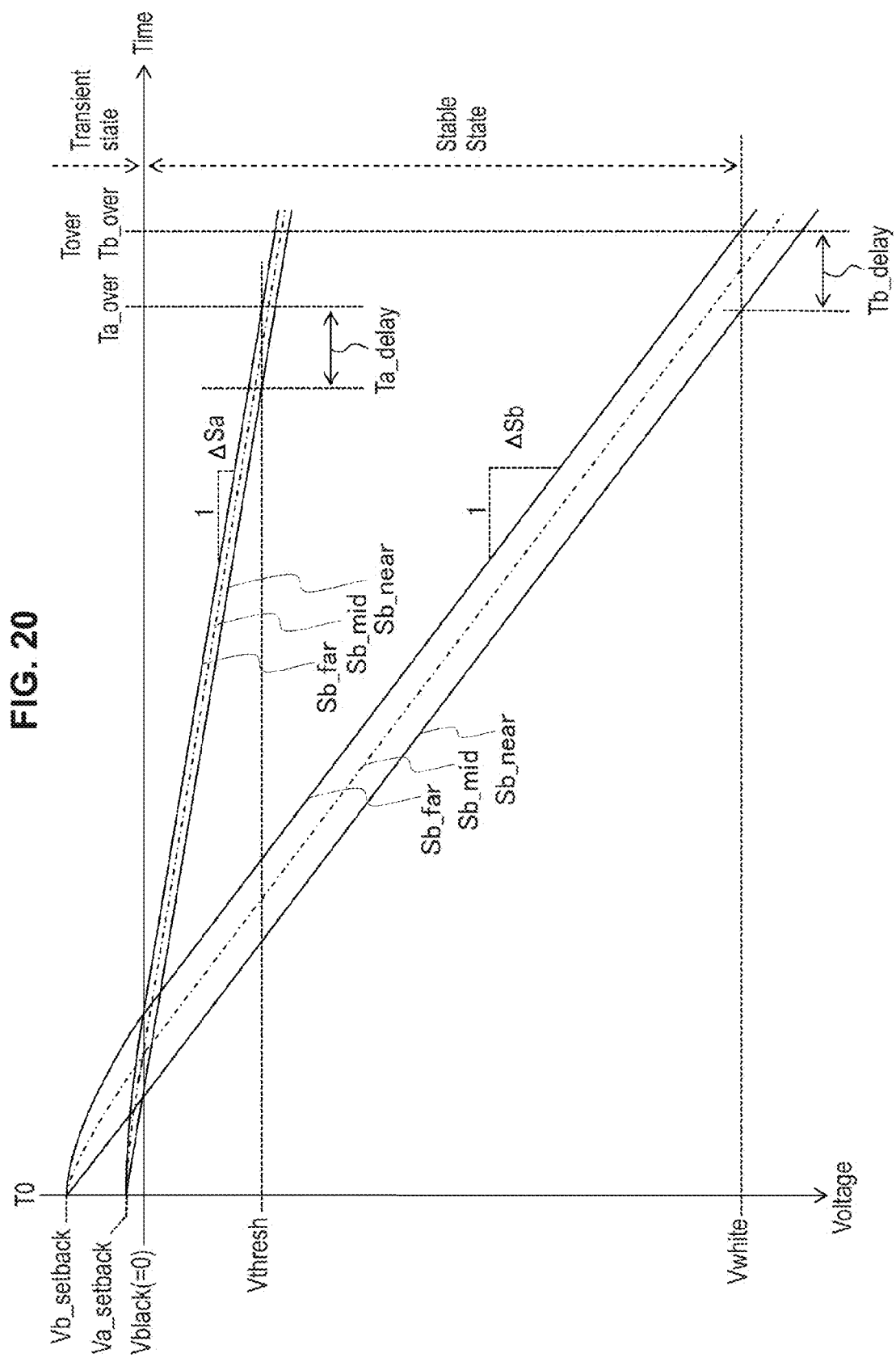
FIG. 20 is a diagram illustrating waveforms of an analog reference signal Vref-A and an analog reference signal Vref-B in the case of a CMOS image sensor of a column AD type.

FIG. 20 illustrates waveforms of the analog reference signal Vref-A and the analog reference signal Vref-B. Here, particularly, FIG. 20 illustrates a waveform when a column AD converter is employed. A vertical axis (voltage) represents an analog output voltage of a pixel. Here, an average voltage in the light-shielding state (that is, in the state in which the received light quantity is 0) is represented by Vblack, and a voltage of a white level representing a maximum received light quantity is represented by Vwhite.

Further, a horizontal axis (time) represents a time which is a value counted by a digital counter. In the case of the column AD converter, the distance between the reference signal generator 35 and the comparator 22 of FIG. 12 differs depending on a corresponding column, and thus the waveform of the reference signal 32 undergoes a delay according to the distance. Due to this delay, the waveforms of the analog reference signal Vref-A and the analog reference signal Vref-B generated by the reference signal generator 35 differ according to a column.

For example, Sa represents the waveform of the analog reference signal Vref-A, a signal waveform of a column closest to the reference signal generator 35A is represented by Sa_near, a signal waveform of a column farthest from the reference signal generator 35A is represented by Sa_far, and a signal waveform of a column positioned at the midpoint of the two columns is represented by Sa_mid. In other words, a function that converts an analog value of the vertical axis into a digital value of the horizontal axis differs according to the position of a column. A delay amount of the analog reference signal Vref-A of the farthest column with respect to the closest column of the analog reference signal Vref-A is represented by Ta_delay.

Similarly, Sb represents the waveform of the analog reference signal Vref-B, a signal waveform of a column closest to the reference signal generator 35B is represented by Sa_near, a signal waveform of a column farthest from the reference signal generator 35B is represented by Sb_far, and a signal waveform of a column positioned at the midpoint of the two columns is represented by Sb_mid. In other words, a function that converts an analog value of the vertical axis into a digital value of the horizontal axis differs according to the position of a column. A delay amount of the analog reference signal Vref-B of the farthest column with respect to the closest column of the analog reference signal Vref-A is represented by Tb_delay.

In addition, immediately after a voltage starts to drop from an upper limit, a curve-like transient phenomenon is shown. In other words, a curve is shown in a falling portion of a waveform around an original point of FIG. 20, and the curve is noticeably shown in a far column rather than a close column. The transient phenomenon gets weaker gradually, a non-steady phenomenon gets stronger gradually, and so a stable state is made. Thus, a portion in which the non-steady phenomenon is strong is used in AD conversion requiring linearity of an IO characteristic.

In other words, when the start voltage of the analog reference signal Vref-A is set to Va_setback and the start voltage of the analog reference signal Vref-B is set to Vb_setback, a conversion result which is high in linearity of an IO characteristic can be obtained using a range of [Vblack,Vwhite] which is a value range of a pixel signal, that is, a portion in which the non-steady phenomenon is strong (a range of the stable state of FIG. 20) without using a portion in which the transient phenomenon is strong (a range of the transient state of FIG. 20).

For the sake of simplification of description, in FIG. 20, the level of Vblack is used as the original point of the vertical axis. The level of Vblack may undergo a small voltage variation due to influence of a temperature change and the like. However, since the description will be complicated, here, the variation in the level of Vblack is not illustrated in FIG. 20. The variations in the levels of Vwhite and Vthresh that vary according thereto are not illustrated in FIG. 20. When the variations are considered, for example, a problem may be solved using a maximum value of Vwhite when Vwhite varies, a minimum value of Vthresh when Vthresh varies, and a minimum value of Vblack when Vblack varies.

An inclination ΔSa of the analog reference signal Vref-A, an inclination ΔSb of the analog reference signal Vref-B, and a time (count number) Tover taken for AD conversion, and the like which are illustrated in FIG. 20 are obtained based on a noise characteristic of an analog pixel signal.

First, as constants representing characteristics of a pixel signal input to the AD converter, an average voltage of a pixel signal in the light-shielding state (that is, the received light quantity 0) is Vblack of the following Formulas (14) and (15), a standard deviation of noise of a pixel signal in the light-shielding state (that is, the received light quantity 0) is σ of Formula (14), and a voltage of a white level representing a maximum received light quantity is Vwhite of the following Formulas (13) and (15). The number of electrons corresponding to the white level is Ewhite of Formula (15).

Further, a start voltage of the analog reference signal Vref-A is Va_setback of Formula (13), and a start voltage of the analog reference signal Vref-B is Vb_setback of Formula (13). A delay amount of the analog reference signal Vref-A of the farthest column with respect to the closest column is Ta_delay of Formula (13), and a delay amount of the analog reference signal Vref-B of the farthest column with respect to the closest column is Tb_delay of Formula (13). The constants are estimate values obtained by arbitrary methods.

Further, as constants related to the image quality, a parameter for deciding the image quality of a dark image portion is Ka of Formula (14), and a parameter for deciding the image quality of a bright image portion is Kb of Formula (14). For example, normal values of the parameters Ka and Kb are 1 and 1, respectively. When the values decrease there is a trade-off in which the image quality is somewhat improved, but a time taken for AD conversion increases, and thus a parameter is decided according to the user's request.

In the above setting, when all values in a range of [0,Vwhite] are assigned to Vthresh in Formulas (13) and (14) and Tover in the following Formula (12) is evaluated, Vthresh causing Tover to be minimum is decided. Tover is a minimum time (count number) taken for AD conversion. When Vthresh causing Tover to be minimum is obtained, ΔSa in Formula (14) representing the inclination of the analog reference signal Vref-A, ΔSb in Formula (14) representing the inclination of the analog reference signal Vref-B, Ta_over in Formula (13) representing a saturation value of the AD converting unit 29A, and Tb_over in Formula (13) representing a saturation value of the AD converting unit 29B are dependently decided.

Tover obtained as described above is a minimum number of pulses applied from the timing control circuit 31 to the counters of the AD converters 29A and 29B. In other words, as the timing control circuit 31 is designed to transition to the next operation immediately after pulses are applied to the counters of the AD converters 29A and 29B by Tover times, a useless counting operation can be prevented, and an operation time can be optimized. In other words, the effects by which power consumption is reduced and the operation speed increases are obtained. An actual value of Tover may be set to a slightly large value in consideration of a variation in a device characteristic. Further, the noise characteristic is not limited to thermal noise and short noise, and Vthresh causing Tover to be minimum may be obtained in terms of all noises included in an analog pixel signal such as dark current noise and random telegraph noise, similarly to the above description.

$$T_{over} := \max(T_{a\_over}, T_{b\_over}) \quad (12)$$

$$\begin{aligned} T_{b\_over} &:= \frac{V_{white} - V_{b\_setback}}{\Delta S_b} + T_{b\_delay} \\ T_{a\_over} &:= \frac{V_{thresh} - V_{a\_setback}}{\Delta S_a} + T_{a\_delay} \end{aligned} \quad (13)$$

$$\begin{aligned} \Delta S_a &:= K_a \cdot \sigma \\ \Delta S_b &:= K_b \cdot \sqrt{\sigma^2 + G \cdot (V_{thresh} - V_{black})} \end{aligned} \quad (14)$$

$$G := \frac{V_{white} - V_{black}}{E_{white} - 0} \quad (15)$$

Figure 21:
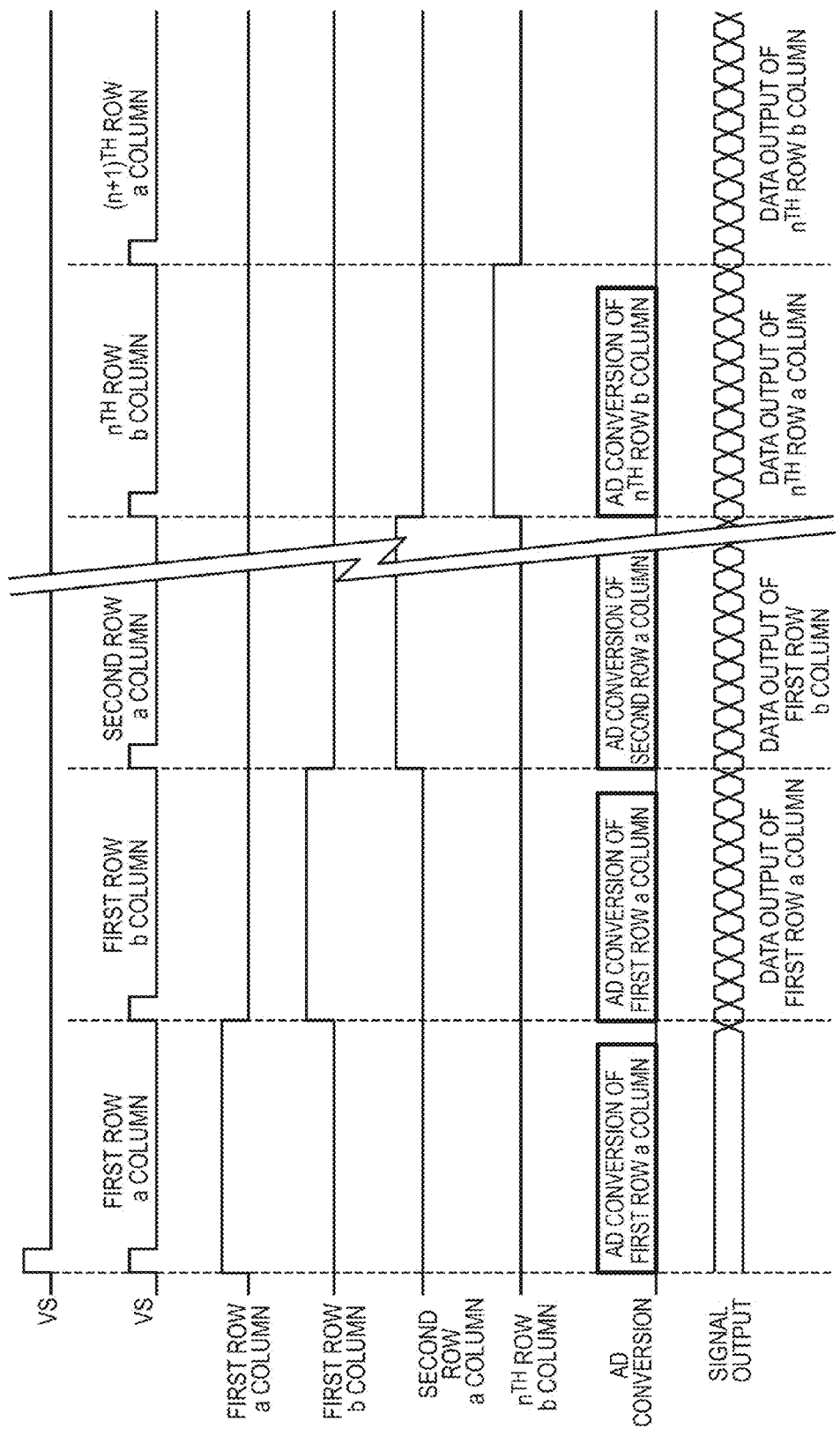
FIG. 21 is a diagram illustrating a waveform chart generated by a timing control circuit that controls an operation of a CMOS image sensor.

FIG. 21 is a waveform chart generated by the timing control circuit 31 that controls an operation of the CMOS image sensor 100. VS is a vertical synchronous signal representing a one-frame period of time. Basically, Vs represents a timing at which the pixel array unit 10 of the CMOS image sensor 100 performs processing in units of images. HS is a horizontal synchronous signal representing one horizontal scanning period of time. Basically, HS represents a timing at which the pixel array unit 10 of the CMOS image sensor 100 performs processing in units of rows.

Basically, processing is performed in units of rows, but the CMOS image sensor 100 performs processing such that each row is divided into an even-numbered column and an odd-numbered column using the multiplexer 21. In this regard, a first row to an $n^{th}$ row are sequentially selected at each timing of HS, and an even-numbered column and an odd-numbered column are sequentially selected in each row. Specifically, the row scanning circuit 36 selects a row through the row signal line 13, and the multiplexer 21 selects the column signal line 12. In the waveform chart, using a terminal name of the multiplexer 21, an even-numbered column is referred to as an "a column," and an odd-numbered column is referred to as a "b column."

The AD converter 29 performs the AD conversion operation in response to each horizontal synchronous signal HS. An output of the result obtained by the AD converter 29 is controlled by the bus buffer 24, and the result is sequentially output using the horizontal output line 38. In other words, as the bus buffer 24 is sequentially scanned by the column scanning circuit 37, the count value of the counter circuit 23 is transferred to the digital compositing unit 39 through the horizontal output line 38. The bus buffer 24 with the latch has an advantage that the AD conversion operation and the transfer operation can be performed in parallel and thus the high-speed transfer can be performed, but a latch function is not essential.

Figure 22:
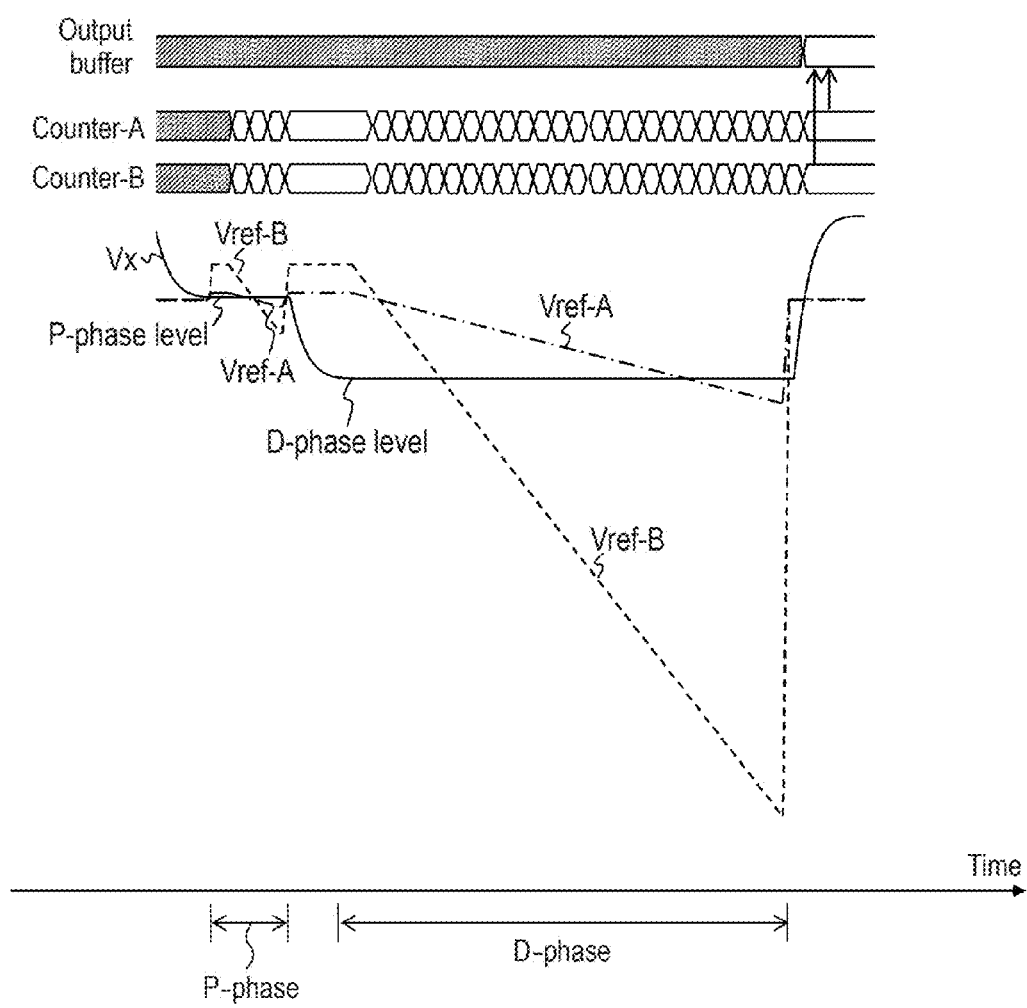
FIG. 22 is a diagram for describing conciseness of an AD converter of a column AD type according to the present technology.

Particularly, the present technology is suitable for a configuration in which the AD converter of the column AD type illustrated in FIG. 22 is mounted and performs digital CDS. A signal level Vx of a pixel represents a reset level during a period of time of a P phase, and represents a signal level during a period of time of a D phase. When the P-phase level and the D-phase level are measured, the levels are measured by simultaneously comparing the signal level Vx with the two types of reference signals Vref-A and Vref-B. A counter-A and a counter-B perform counting in a negative direction in the P phase, perform counting in a positive direction in the D phase, and measure a level difference. In other words, digital CDS is performed by each of the counter-A and the counter-B. In other words, the present technology is implemented simply using the two counters.

Figure 23:
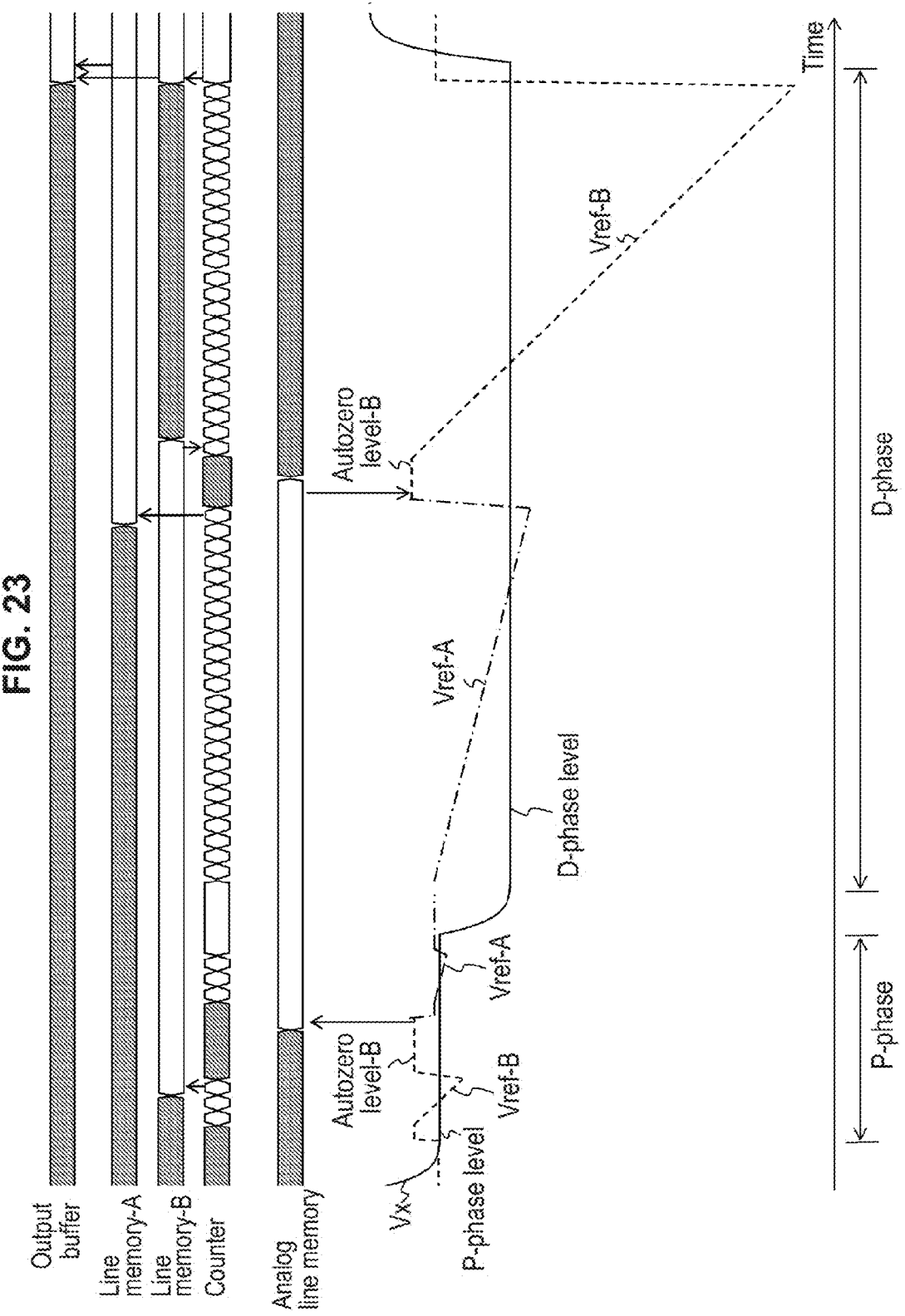
FIG. 23 is a diagram for describing complexity of an AD converter of a column AD type according to a related art.

Meanwhile, FIG. 23 illustrates an implementation example of a configuration in which the AD converter of the column AD type is mounted and performs digital CDS in order to compare the present technology with a related art. In the related art, in order to differentiate the resolution through time division, after the reference signal Vref-B is used in the P phase, a comparison is made through time division using the reference signal Vref-A, and then after the reference signal Vref-A is used in the D phase, a comparison is made through time division using the reference signal Vref-B. The counter is a counter that counts a time in the AD converter. In the related art, since it is necessary to perform a temporary retreat of a value when the resolution is differentiated through time division, line memories such as a line memory-A and a line memory-B which are components of the related art are necessary, and thus the size of a circuit increases. In terms of an operation, loading and storing of a value with the line memories is performed, and thus there is a disadvantage in that control is complicated.

Further, it is necessary to store an analog level adjusted by the auto zero of the comparator. Thus, an analog storage circuit (analog line memory) is necessary, and thus there is a disadvantage in that the circuit size increases. In addition, since the resolution is differentiated through time division, the related art is not desirable in terms of high-speed performance. In other words, the present technology is small in the circuit size, faster in speed, and more excellent than the related art. The effect of low power consumption is obtained by this feature.

[Color Array of Pixel Array Unit]

Figure 24:
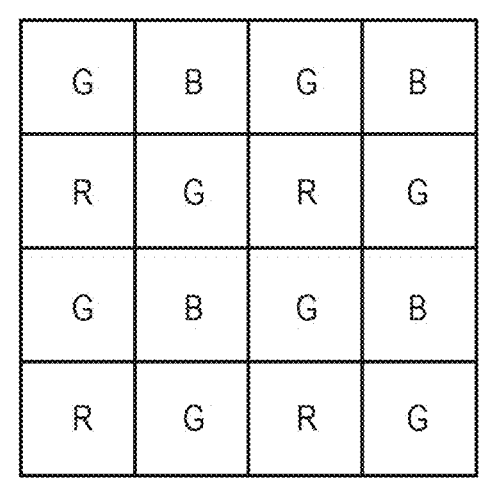

A color array example of the pixel array unit 101 (the pixel array unit 10) will be described. For example, the pixel array unit 101 has a color array of a Bayer array illustrated in FIG. 24. In this embodiment, the analog pixel signal Vx is converted into the digital pixel signal using the two analog reference signals Vref-A and Vref-B which differ in the inclination, and thus the present technology can be suitably applied even to a color array in which pixels greatly differing in spectral sensitivity are mixed as in the following (1) and (2). In other words, a signal of a pixel needing a dynamic range larger than RGB of the related art can be converted in a large dynamic range having small noise regardless of whether a signal level is small or large. In short, in the related art, ISO sensitivity is changed before capturing is performed, but in the AD conversion method according to the present technology, it is not necessary to change the ISO sensitivity before capturing, and pixels greatly differing in spectral sensitivity may be mixed.

Figure 25:
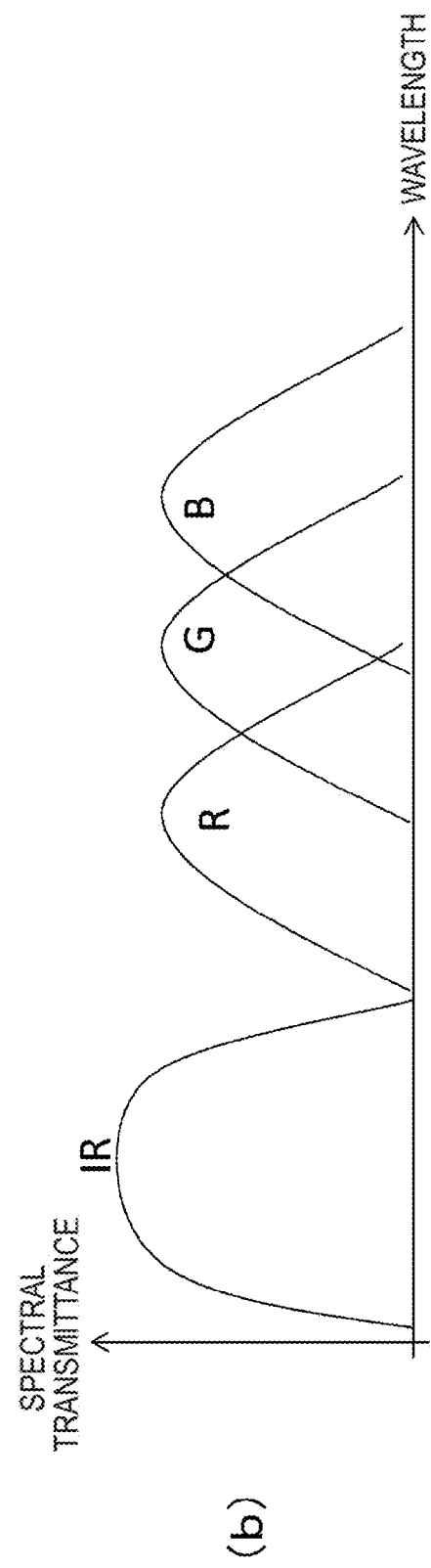
FIG. 25 is a diagram illustrating an example in which pixels that greatly differ in sensitivity of light such as visible light and invisible light are present together as a color array of a pixel array unit.

(1) A color array of the pixel array unit 101 includes pixels that greatly differ in sensitivity of light such as visible light and invisible light. For example, FIG. 25(a) illustrates a color array of this example, and pixels of visible light (R, G, and B) and pixels of invisible light (IR) are present together. FIG. 25(b) illustrates spectral transmittance of a color filter of a pixel, a horizontal axis represents a wavelength of light, and a vertical axis represents spectral transmittance. In this example, sensitivity of a pixel of invisible light (IR) is better than sensitivity of a pixel of visible light (R, G, and B). In this case, for example, it is possible to mainly convert an analog pixel signal of a pixel of visible light (R, G, and B) through the AD converting unit 103A having a high gain while mainly converting an analog pixel signal of a pixel of invisible light (IR) through the AD converting unit 103B having a low gain.

Figure 26:
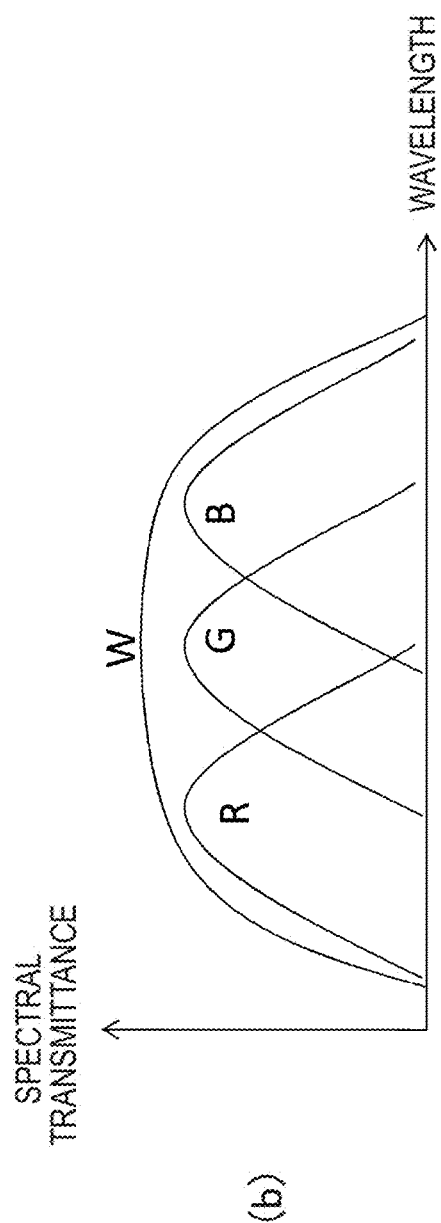
FIG. 26 is a diagram illustrating an example in which pixels which greatly differ in sensitivity of light such as color of a narrow band and color of a broad band are present together as a color array of a pixel array unit.

(2) A color array of the pixel array unit 101 includes pixels which greatly differ in sensitivity of light such as color of a narrow band and color of a broad band. For example, FIG. 26(a) illustrates a color array of this example, and a pixel of color (R, G, and B) of a narrow band and a pixel of color (W) of a broad band are presented together. FIG. 26(b) illustrates spectral transmittance of a color filter of a pixel, a horizontal axis represents a wavelength of light, and a vertical axis represents spectral transmittance. In this example, sensitivity of a pixel of color (W) of a broad band is better than sensitivity of a pixel of color (R, G, and B) of a narrow band. In this case, for example, it is possible to mainly convert an analog pixel signal of a pixel of color (R, G, and B) of a narrow band through the AD converting unit 103A having a high gain while mainly converting an analog pixel signal of a pixel of color (W) of a broad band through the AD converting unit 103B having a low gain.

As described above, in the CMOS image sensor 100 illustrated in FIG. 1, a pixel signal output from the unit pixel 11 is converted through the two independent AD converting units 103A and 103B using the analog reference signals having different inclinations. In other words, the two AD converting units that compare a level of an analog reference signal with a level of an analog pixel signal and convert the analog pixel signal into a digital pixel signal are arranged, and the digital compositing unit 108 simultaneously reads and composites the digital pixel signals which are outputs of the two AD converting units 103A and 103B, and then outputs a composite value. The AD conversion using the analog reference signals having different inclinations is not performed through time division, and a line memory necessary in a time division scheme of a related art which temporarily stores the result is unnecessary. Thus, the circuit size is reduced, and the cost of a product is reduced. Further, since an AD conversion time can be reduced, a high-speed operation can be performed, and low power consumption can be achieved.

In addition, in the CMOS image sensor 100 illustrated in FIG. 1, the analog pixel signal is converted through the two independent AD converting units 103A and 103B, but pixel signals of two columns of the pixel array unit 101 are selectively supplied to one AD converting unit through the multiplexer 102. Thus, an increase in the number of AD converting units can be suppressed. Thus, even when a mounting area of a semiconductor substrate is narrow, mounting can be easily performed.

In addition, in the CMOS image sensor 100 illustrated in FIG. 1, the AD converting units 103A and 103B are arranged to be opposite to each other with the pixel array unit 101 interposed therebetween. Thus, the two AD converting units 103A and 103B that operate in parallel can be efficiently arranged on a semiconductor substrate. In other words, even when a column width is narrow, many AD converting units can be arranged by the opposed arrangement, and thus the mounting area can be reduced. Meanwhile, when a mounting cost need not be considered or when a sufficient mounting area is secured, a one-sided arrangement may be employed. In this case, when the digital compositing units 108 are configured in parallel such that one digital compositing unit 108 is arranged in units of columns for each set of the AD converting units 103A and 103B, the operation speed of the CMOS image sensor 100 and the data transfer rate can be increased more.

Further, in the CMOS image sensor 100 illustrated in FIG. 1, the inclinations of the analog reference signals Vref-A and Vref-B in the AD converting units 103A and 103B are the inclinations $\Delta Sa$ and $\Delta Sb$ obtained based on the noise characteristic of the pixel signal, respectively. Thus, the reference signal generator can be configured with a simple integrator and simply implemented.

Further, in the CMOS image sensor 100 illustrated in FIG. 1, the inclinations of the analog reference signals Vref-A and Vref-B in the AD converting units 103A and 103B are in the mutually scaled relation. Thus, one analog reference signal generator can be configured with an amplifier or an attenuator, and thus the product cost can be reduced.

Furthermore, in the CMOS image sensor 100 illustrated in FIG. 1, when the number of pulses applied to the counter that measures a conversion time in the AD converting units 103A and 103B reaches a predetermined number Tover, the AD converting units 103A and 103B transition to the next operation. Thus, the operation can be performed at a high speed, and the power consumption can be reduced.

2. Modified Example

In the above embodiment, the two AD converting units are arranged in parallel, but a CMOS image sensor in which three or more AD converting units are arranged in parallel can be similarly configured, and a dynamic range of a digital pixel signal can be further increased. In other words, the present technology can be successfully applied even to a solid state imaging device having a large saturated electron amount.

Additionally, the present technology may also be configured as below.

(1) A solid state imaging device, including:
a first analog-to-digital converting unit that compares a level of an analog reference signal with a first inclination with a level of an analog pixel signal output from a pixel array unit, and converts the analog pixel signal into a first digital pixel signal;
a second analog-to-digital converting unit that compares a level of an analog reference signal with a second inclination that is different in inclination from the analog reference signal with the first inclination with a level of the analog pixel signal, and converts the analog pixel signal into a second digital pixel signal; and
a digital compositing unit that composites the first digital pixel signal with the second digital pixel signal, and outputs a composite result.

(2) The solid state imaging device according to (1),
wherein the digital compositing unit includes
a determining unit that, of the first digital pixel signal and the second digital pixel signal, regards a digital pixel signal converted using an analog reference signal with a small inclination as one digital pixel signal, regards a digital pixel signal converted using an analog reference signal with a large inclination as the other digital pixel signal, compares the one digital pixel signal with a predetermined threshold value to determine a magnitude relation, and obtains a selection signal,
a selecting unit that extracts the one digital pixel signal when it is determined that the one digital pixel signal is less than the predetermined threshold value based on the selection signal, and extracts the other digital pixel signal when it is determined that the one digital pixel signal is equal to or more than the predetermined threshold value, and
a combining unit that combines the extracted digital pixel signal with the selection signal, and outputs a combined signal.

(3) The solid state imaging device according to (2), further including
a signal processing unit that receives an output signal of the digital compositing unit, and performs magnification correction on the digital pixel signal based on the selection signal combined with the digital pixel signal.

(4) The solid state imaging device according to (1),
wherein the digital compositing unit combines the first digital pixel signal and the second digital pixel signal to be composited into a signal with a large bit width and outputs a composite result, or interleaves and composites the first digital pixel signal and the second digital pixel signal, and outputs a composite result.

(5) The solid state imaging device according to (4), further including
a signal processing unit that processes an output signal of the digital compositing unit,
wherein the signal processing unit includes
a determining unit that, of the first digital pixel signal and the second digital pixel signal, regards a digital pixel signal converted using an analog reference signal with a small inclination as one digital pixel signal, regards a digital pixel signal converted using an analog reference signal with a large inclination as the other digital pixel signal, compares the one digital pixel signal with a predetermined threshold value to determine a magnitude relation, and obtains a selection signal,
a selecting unit that extracts the one digital pixel signal when it is determined that the one digital pixel signal is less than the predetermined threshold value based on the selection signal, and extracts the other digital pixel signal when it is determined that the one digital pixel signal is equal to or more than the predetermined threshold value, and
a signal processing unit that performs magnification correction on the extracted digital pixel signal based on the selection signal.

(6) The solid state imaging device according to (1),
wherein the digital compositing unit further includes an estimating unit that calculates correction information used to accurately perform magnification correction.

(7) The solid state imaging device according to (6),
wherein the estimating unit obtains a correction value used to convert a digital pixel signal in a manner that an inaccurate distribution of a digital pixel signal becomes an accurate distribution.

(8) The solid state imaging device according to any one of (1) to (7),
wherein the first inclination and the second inclination are each an inclination obtained based on a noise characteristic of the pixel signal.

(9) The solid state imaging device according to any one of (1) to (8), wherein the analog-to-digital converting unit transitions to a next operation when pulses applied to a counter that counts a conversion time in the analog-to-digital converting unit reach a predetermined number.

(10) The solid state imaging device according to (8) or (9), wherein, where a standard deviation of noise when a light quantity is 0 is represented by σ (electron), a number of saturated electrons of a pixel is represented by Vwhite, and parameters are represented by Ka and Kb, by Vthresh causing Tover of the following Formula (16) to be minimum, the first inclination is given as ΔSa, the second inclination is given as ΔSb, and the predetermined number in the analog-to-digital converting unit is given as Tover.

$$Tover := \max(V_{thresh}/\Delta Sa, V_{white}/\Delta Sb) \qquad (16)$$

$$\begin{pmatrix} \Delta Sa = Ka * \sigma \\ \Delta Sb = Kb * \sqrt{\sigma^2 + Vthresh} \end{pmatrix}$$

(11) The solid state imaging device according to (8) or (9), wherein, where a standard deviation of noise when a light quantity is 0 is represented by σ (electron), a number of saturated electrons of a pixel is represented by Vwhite, parameters are represented by Ka and Kb, a start voltage of the analog reference signal with the first inclination is represented by Va_setback, a start voltage of the analog reference signal with the second inclination is represented by Vb_setback, a delay amount of the analog reference signal with the first inclination of a farthest column with respect to a closest column is represented by Ta_delay, and a delay amount of the analog reference signal with the second inclination of a farthest column with respect to a closest column is represented by Tb_delay, by Vthresh causing Tover of the following Formula (17) to be minimum, the first inclination is given as ΔSa, the second inclination is given as ΔSb, and the predetermined number in the analog-to-digital converting unit is given as Tover.

$$Tover := \qquad (17)$$
$$\max\left(\frac{V_{thresh} - V_{a\_setback}}{\Delta S_a} + T_{a\_delay}, \frac{V_{white} - V_{b\_setback}}{\Delta S_b} + T_{b\_delay}\right)$$

$$\begin{pmatrix} \Delta S_a := K_a \cdot \sigma \\ \Delta S_b := K_b \cdot \sqrt{\sigma^2 + G \cdot (V_{thresh} - V_{black})} \\ G := \frac{V_{white} - V_{black}}{E_{white} - 0} \end{pmatrix}$$

(12) The solid state imaging device according to any one of (1) to (11), wherein the analog reference signal with the first inclination and the analog reference signal with the second inclination are in a mutually scaled relation.

(13) The solid state imaging device according to (12), wherein one of the analog reference signal with the first inclination and the analog reference signal with the second inclination is generated by a reference signal generator, and the other is obtained in a manner that an analog reference signal generated by the reference signal generator is amplified by an amplifier or attenuated by an attenuator.

(14) The solid state imaging device according to any one of (1) to (13), wherein the pixel array unit is a pixel array unit in which pixels having greatly different sensitivity of light are present together.

(15) The solid state imaging device according to (14), wherein the pixel array unit includes a pixel having sensitivity to visible light and a pixel having sensitivity to invisible light or includes a pixel having sensitivity in a narrow band or a pixel having sensitivity in a broad band.

(16) The solid state imaging device according to any one of (1) to (15), further including a multiplexer that selectively supplies the analog-to-digital converting unit with pixel signals of a plurality of columns of the pixel array unit.

(17) The solid state imaging device according to any one of (1) to (16), wherein the first analog-to-digital converting unit and the second analog-to-digital converting unit are arranged to be opposite to each other with the pixel array unit interposed therebetween.

(18) A method of outputting an imaging signal, including:

comparing a level of an analog reference signal with a first inclination with a level of an analog pixel signal output from a pixel array unit, and performing conversion into a first digital pixel signal;

comparing a level of an analog reference signal with a second inclination which is different in inclination from the analog reference signal with the first inclination with a level of the analog pixel signal, and performing conversion into a second digital pixel signal; and compositing the first digital pixel signal with the second digital pixel signal and outputting a composite result.

(19) An electronic device including a solid state imaging device including:

a first analog-to-digital converting unit that compares a level of an analog reference signal with a first inclination with a level of an analog pixel signal output from a pixel array unit, and performs conversion into a first digital pixel signal;

a second analog-to-digital converting unit that compares a level of an analog reference signal with a second inclination that is different in inclination from the analog reference signal with the first inclination with a level of the analog pixel signal, and performs conversion into a second digital pixel signal; and a digital compositing unit that composites the first digital pixel signal with the second digital pixel signal, and outputs a composite result.

(20) A solid state imaging device, including:

a plurality of analog-to-digital converting units that compare levels of a plurality of analog reference signals having different inclinations with a level of an analog pixel signal output from a pixel array unit, and convert the analog pixel signal into a plurality of digital pixel signals; and a digital compositing unit that composites the plurality of digital pixel signals and outputs a composite result.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-072656 filed in the Japan Patent Office on Mar. 28, 2012, the entire content of which is hereby incorporated by reference.

What is claimed is:

1. An imaging system comprising:
a pixel array including a plurality of pixels;
a first analog-to-digital converter coupled to at least one of the plurality of pixels and configured to convert an analog signal into a first digital signal based on a first reference signal; and
a second analog-to-digital converter coupled to the at least one of the plurality of pixels and configured to convert the analog signal into a second digital signal based on a second reference signal which is different from the first reference signal,
wherein the first digital signal and the second digital signal are composited to generate a composited signal by a compositing unit that includes a first offset adjusting unit configured to perform an offset adjustment for shifting a black level of a first pixel signal and a second offset adjusting unit configured to perform an offset adjustment for shifting a black level of a second pixel signal.

2. The imaging system according to claim 1, wherein:
the first reference signal is generated by a first reference signal generator, and
the second reference signal is an amplified first reference signal amplified by an amplifier.

3. The imaging system according to claim 1, wherein:
the first analog-to-digital converter includes a first comparator and a first digital counter, the first comparator comparing the analog signal to the first reference signal, the first digital counter outputting the first digital signal in accordance with a result of the first comparator, and
the second analog-to-digital converter includes a second comparator and a second digital counter, the second comparator comparing the analog signal to the second reference signal, the second digital counter outputting the second digital signal in accordance with a result of the second comparator.

4. The imaging system according to claim 1, further comprising:
a first multiplexer coupled to at least one of the plurality of pixels and to the first analog-to-digital converter; and
a second multiplexer coupled to at least one of the plurality of pixels and to the second analog-to-digital converter.

5. The imaging system according to claim 4, wherein:
the first multiplexer is configured to selectively supply at least one pixel signal to the first analog-to-digital converter, and
the second multiplexer is configured to selectively supply at least one pixel signal to the second analog-to-digital converter.

6. The imaging system according to claim 1, further comprising:
a compositing unit configured to generate the composited signal at least by compositing the first digital signal and the second digital signal.

7. An imaging device comprising:
a pixel array including a plurality of pixels;
a first analog-to-digital converter coupled to at least one of the plurality of pixels and configured to convert an analog signal into a first digital signal based on a first reference signal;
a second analog-to-digital converter coupled to the at least one of the plurality of pixels and configured to convert the analog signal into a second digital signal based on a second reference signal which is different from the first reference signal; and
a compositing unit configured to composite the first digital signal and the second digital signal, wherein the compositing unit includes a first offset adjusting unit configured to perform an offset adjustment for shifting a black level of a first pixel signal and a second offset adjusting unit configured to perform an offset adjustment for shifting a black level of a second pixel signal.

8. The imaging device according to claim 7, wherein:
the first reference signal is generated by a first reference signal generator, and
the second reference signal is an amplified first reference signal amplified by an amplifier.

9. The imaging device according to claim 7, wherein:
the first analog-to-digital converter includes a first comparator and a first digital counter, the first comparator comparing the analog signal to the first reference signal, the first digital counter outputting the first digital signal in accordance with a result of the first comparator, and
the second analog-to-digital converter includes a second comparator and a second digital counter, the second comparator comparing the analog signal to the second reference signal, the second digital counter outputting the second digital signal in accordance with a result of the second comparator.

10. The imaging device according to claim 7, further comprising:
a first multiplexer coupled to at least one of the plurality of pixels and to the first analog-to-digital converter; and
a second multiplexer coupled to at least one of the plurality of pixels and to the second analog-to-digital converter.

11. The imaging device according to claim 10, wherein:
the first multiplexer is configured to selectively supply at least one pixel signal to the first analog-to-digital converter, and
the second multiplexer is configured to selectively supply at least one pixel signal to the second analog-to-digital converter.

12. An imaging method, the method comprising:
converting an analog signal into a first digital signal based on a first reference signal;
converting the analog signal into a second digital signal based on a second reference signal which is different from the first reference signal;
generating a composited signal at least by compositing the first digital signal and the second digital signal,
performing a first offset adjustment for shifting a black level of a first pixel signal; and
performing a second offset adjustment for shifting a black level of a second pixel signal.

13. The imaging method according to claim 12, further comprising:
generating the first reference signal, and
producing the second reference signal at least by amplifying the first reference signal.

14. The imaging method according to claim 12, further comprising:
comparing the analog signal to the first reference signal to produce a first result;
outputting the first digital signal in accordance with the first result;
comparing the analog signal to the second reference signal to produce a second result; and outputting the second digital signal in accordance with the second result.

15. The imaging method according to claim 12, further comprising:
prior to converting the analog signal into the first digital signal, selectively supplying at least one first pixel signal, and
prior to converting the analog signal into the second digital signal, selectively supplying at least one second pixel signal.

16. The imaging method according to claim 12, further comprising:
combining the first digital signal and the second digital signal into the composited signal; and
outputting the composited signal to an external output line.

17. The imaging method according to claim 16, further comprising:
receiving the composited signal; and
performing magnification correction on the composited signal.

* * * * *